US011971682B2

(12) United States Patent
Kakuta et al.

(10) Patent No.: US 11,971,682 B2
(45) Date of Patent: Apr. 30, 2024

(54) CARTRIDGE AND IMAGE FORMING APPARATUS

(71) Applicant: CANON KABUSHIKI KAISHA, Tokyo (JP)

(72) Inventors: Hideki Kakuta, Shizuoka (JP); Toshiaki Takeuchi, Shizuoka (JP); Yu Akiba, Shizuoka (JP); Shuichi Gofuku, Shizuoka (JP); Tomofumi Kawamura, Shizuoka (JP); Yusuke Atsu, Kanagawa (JP); Joji Goto, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/298,192

(22) Filed: Apr. 10, 2023

(65) Prior Publication Data

US 2023/0244181 A1 Aug. 3, 2023

Related U.S. Application Data

(63) Continuation of application No. 17/673,156, filed on Feb. 16, 2022, now Pat. No. 11,650,538, which is a (Continued)

(30) Foreign Application Priority Data

Sep. 17, 2019 (JP) ................................ 2019-168215
Sep. 17, 2019 (JP) ................................ 2019-168216
(Continued)

(51) Int. Cl.
*G03G 21/18* (2006.01)

(52) U.S. Cl.
CPC ..... *G03G 21/1814* (2013.01); *G03G 21/1821* (2013.01); *G03G 21/1825* (2013.01)

(58) Field of Classification Search
CPC ............... G03G 21/1676; G03G 21/18; G03G 21/1814; G03G 21/1817; G03G 21/1821; G03G 21/1825; G03G 21/185
See application file for complete search history.

(56) References Cited

U.S. PATENT DOCUMENTS 8,559,847 B2 * 10/2013 Murakawa ......... G03G 21/1821 399/113
2017/0082971 A1 * 3/2017 Maeshima ......... G03G 21/1842

FOREIGN PATENT DOCUMENTS

CN 105607442 A 5/2016
CN 107132738 A 9/2017
(Continued)

*Primary Examiner* — Hoang X Ngo
(74) *Attorney, Agent, or Firm* — Canon U.S.A., Inc. I.P. Division

(57) ABSTRACT

A cartridge includes a first unit including a photosensitive member, and a second unit including a developer bearing member and a force receiving portion, the second unit being configured to be rotatable about a first axis to move with respect to the first unit between a first position and a second position. In a state where the first unit is in a same posture as when an image forming operation is performed, the second unit is disposed at the second position by its own weight. The developer bearing member is configured to be rotatable about a second axis. When seen in the direction of the first axis, a first distance between the force receiving portion and the second axis is smaller than a second distance between the first axis and the second axis and a third distance between the first axis and the force receiving portion.

17 Claims, 8 Drawing Sheets

Related U.S. Application Data continuation of application No. PCT/JP2020/032290, filed on Aug. 27, 2020.

(30) Foreign Application Priority Data

| | | | |
|---|---|---|---|
| Sep. 17, 2019 | (JP) | ................................ | 2019-168217 |
| Jul. 31, 2020 | (JP) | ................................ | 2020-129829 |
| Jul. 31, 2020 | (JP) | ................................ | 2020-129830 |
| Jul. 31, 2020 | (JP) | ................................ | 2020-129831 |

(56) References Cited

FOREIGN PATENT DOCUMENTS

| | | | |
|---|---|---|---|
| CN | 107179662 | A | 9/2017 |
| JP | 2014067006 | A | 4/2014 |
| JP | 2014115349 | A | 6/2014 |

* cited by examiner

CARTRIDGE AND IMAGE FORMING APPARATUS

CROSS-REFERENCE TO RELATED APPLICATIONS

This application is a Continuation of U.S. patent application Ser. No. 17/673,156, filed Feb. 16, 2022, which is a Continuation of International Patent Application No. PCT/JP2020/032290, filed Aug. 27, 2020, which claims the benefit of Japanese Patent Application No. 2019-168217, filed Sep. 17, 2019, Japanese Patent Application No. 2019-168216, filed Sep. 17, 2019, Japanese Patent Application No. 2019-168215, filed Sep. 17, 2019, Japanese Patent Application No. 2020-129831, filed Jul. 31, 2020, Japanese Patent Application No. 2020-129829, filed Jul. 31, 2020, and Japanese Patent Application No. 2020-129830, filed Jul. 31, 2020, all of which are hereby incorporated by reference herein in their entirety.

BACKGROUND OF THE INVENTION

Field of the Invention

The present invention relates to an electrophotographic image forming apparatus (image forming apparatus) and a cartridge that is used for the same.

Background Art

Electrophotographic image forming apparatuses (image forming apparatuses) are apparatuses for forming an image on a recording medium by using an electrophotographic image forming method. Examples of the image forming apparatuses include an electrophotographic copying machine, an electrophotographic printer (such as a light-emitting diode (LED) printer, a laser beam printer), a facsimile apparatus, and a word processor.

Cartridges are configured to be detachably attachable to an apparatus main body of an image forming apparatus. Examples of the cartridges include a process cartridge. A process cartridge refers to a cartridge that includes an electrophotographic photosensitive member (photosensitive member) and process units that acts on the photosensitive member. Examples of the process units include a developing unit, a charging unit, and a cleaning unit. The use of cartridges allows replacement of the cartridges and facilitates maintenance of the image forming apparatus.

Patent Literature (PTL) 1 discusses a process cartridge having a configuration in which a developing unit including a developing roller is movably coupled with a drum unit including a photosensitive drum. The process cartridge includes a spring. The spring biases the developing unit toward the drum unit, whereby the developing roller is brought into contact with the photosensitive drum. When an image forming operation is not performed, a separation member disposed on the main body of the image forming apparatus biases the developing unit, whereby the developing roller is separated from the photosensitive drum (PTL 1).

Some image forming apparatuses have a configuration in which the developing roller is separated from the photosensitive drum by the own weight of the developing device, and a pressing member disposed on the main body of the image forming apparatuses presses the developing device to bring the developing roller into contact with or close to the photosensitive drum (PTL 2 and PTL 3)

CITATION LIST

Patent Literature

PTL1: Japanese Patent Application Laid-Open No. 2009-288302
PTL2: Japanese Patent Application Laid-Open No. 2002-174938
PTL3: Japanese Patent Application Laid-Open No. 2012-58627

SUMMARY OF THE INVENTION

The present invention is a further development of the prior art.

The present invention relates to a cartridge that includes a first unit including a photosensitive member and a second unit including a developer bearing member, where the developer bearing member is separated from the photosensitive member by the own weight of the second unit, and an image forming apparatus including the foregoing cartridge.

One of the objects of the present invention is to suitably dispose a force receiving portion that receives force for bringing the developer bearing member into contact with the photosensitive member, a rotation axis of the second unit, and the developer bearing member.

One of the objects of the present invention is to stably separate the developer bearing member from the photosensitive member.

One of the objects of the present invention is to reduce a force for bringing the developer bearing member into contact with the photosensitive member.

The following is an aspect of the present invention.

A cartridge to be attached to an apparatus main body of an image forming apparatus configured to perform an image forming operation, the cartridge includes a first unit including a photosensitive member, and a second unit coupled with the first unit and including a developer bearing member and a force receiving portion, the second unit being configured to be rotatable about a first axis to move with respect to the first unit between a first position where the developer bearing member is in contact with the photosensitive member and a second position where the developer bearing member is separated from the photosensitive member, and the second unit being configured to, when the force receiving portion receives a force from the apparatus main body, be disposed at the first position, wherein, in a state where the first unit is in a same posture as when the image forming operation is performed, the second unit is configured to be disposed at the second position by its own weight, and the developer bearing member and the force receiving portion are disposed above a horizontal line passing through the first axis, wherein the developer bearing member is configured to be rotatable about a second axis, and wherein, when seen in a direction of the first axis, a first distance between the force receiving portion and the second axis is shorter than a second distance between the first axis and the second axis and a third distance between the first axis and the force receiving portion.

The following is another aspect of the present invention.

A cartridge to be attached to an apparatus main body of an image forming apparatus, the cartridge includes a first unit including a photosensitive member, the first unit being configured to be supported by the apparatus main body, and a second unit coupled with the first unit and including a developer bearing member and a force receiving portion, the second unit being configured to be rotatable about a first axis to move with respect to the first unit between a first position where the developer bearing member is in contact with the photosensitive member and a second position where the developer bearing member is separated from the photosensitive member, and the second unit being configured to, when the force receiving portion receives a force from the apparatus main body, be disposed at the first position, wherein, in a state where the first unit is supported by the apparatus main body, the second unit is configured to be disposed at the second position by its own weight, and the developer bearing member and the force receiving portion are disposed above a horizontal line passing through the first axis, and wherein the developer bearing member is configured to be rotatable about a second axis, and a first distance between the force receiving portion and the second axis in a direction orthogonal to the first axis is smaller than a second distance between the first axis and the second axis and a third distance between the first axis and the force receiving portion.

The following is yet another aspect of the present invention.

A cartridge to be attached to an apparatus main body of an image forming apparatus configured to perform an image forming operation, the cartridge includes a first unit including a photosensitive member, and a second unit coupled with the first unit and including a developer bearing member, a force receiving portion, and a developing frame configured to support the developer bearing member, the second unit being configured to be rotatable about a first axis to move with respect to the first unit between a first position where the developer bearing member is in contact with the photosensitive member and a second position where the developer bearing member is separated from the photosensitive member, and the second unit being configured to, when the force receiving portion receives a force from the apparatus main body, be disposed at the first position, wherein, in a state where the first unit is in a same posture as when the image forming operation is performed, the second unit is configured to be disposed at the second position by its own weight, and the developer bearing member is disposed above a horizontal line passing through the first axis, wherein the developing frame includes a partition wall configured to divide an interior of the developing frame between a developer accommodation chamber configured to accommodate a developer and a developing chamber where the developer bearing member is disposed, the partition wall having an opening through which the developer accommodation chamber and the developing chamber communicate with each other, and wherein, when seen in a direction of the first axis, if the developing chamber is divided between a first region and a second region closer to the photosensitive member than the first region by a vertical line passing through the first axis in a state where the first unit is in the same posture as when the image forming operation is performed and the second unit is disposed at the first position, the first region has a capacity greater than that of the second region.

The following is yet another aspect of the present invention.

A cartridge that is attached to an apparatus main body of an image forming apparatus, the cartridge includes a first unit including a photosensitive member, the first unit being configured to be supported by the apparatus main body, and a second unit coupled with the first unit and including a developer bearing member, a force receiving portion, and a developing frame configured to support the developer bearing member, the second unit being configured to be rotatable about a first axis to move with respect to the first unit between a first position where the developer bearing member is in contact with the photosensitive member and a second position where the developer bearing member is separated from the photosensitive member, and the second unit being configured to, when the force receiving portion receives a force from the apparatus main body, be disposed at the first position, wherein, in a state where the first unit is supported by the apparatus main body, the second unit is configured to be disposed at the second position by its own weight, and the developer bearing member is disposed above a horizontal line passing through the first axis, wherein the developing frame includes a partition wall configured to divide an interior of the developing frame between a developer accommodation chamber configured to accommodate a developer and a developing chamber where the developer bearing member is disposed, the partition wall having an opening through which the developer accommodation chamber and the developing chamber communicate with each other, and wherein, when seen in a direction of the first axis, if the developing chamber, is divided between a first region and a second region closer to the photosensitive member than the first region by a vertical line passing through the first axis in a state where the first unit is supported by the apparatus main body and the second unit is disposed at the first position, the first region has a capacity greater than a capacity of the second region.

The following is yet another aspect of the present invention. A cartridge to be attached to an apparatus main body of an image forming apparatus configured to perform an image forming operation, the cartridge includes a first unit including a photosensitive member, and a second unit coupled with the first unit and including a developer bearing member and a force receiving portion, the developer bearing member being configured to be rotatable about a second axis, the second unit being configured to be rotatable about a first axis to move with respect to the first unit between a first position where the developer bearing member is in contact with the photosensitive member and a second position where the developer bearing member is separated from the photosensitive member, and the second unit being configured to, when the force receiving portion receives a force from the apparatus main body, be disposed at the first position, wherein, in a state where the first unit is in a same posture as when the image forming operation is performed, the second unit is configured to be disposed at the second position by its own weight, and the developer bearing member is disposed above a horizontal line passing through the first axis, wherein, in a state where the first unit is in the same posture as when the image forming operation is performed and the second unit is at the first position, the developer bearing member is disposed to overlap a vertical line passing through the first axis when seen in a direction of the first axis, wherein, in a state where the first unit is in the same posture as when the image forming operation is performed and the second unit is at the second position, the developer bearing member is disposed to overlap the vertical line when seen in the direction of the first axis, and wherein, in a state where the first unit is in the same posture as when the image forming operation is performed, the second axis is disposed closer to the photosensitive member than the vertical line when the second unit is at the first position, and the second axis is disposed farther from the photosensitive member than the vertical line when the second unit is at the second position.

The following is yet another aspect of the present invention. A cartridge to be attached to an apparatus main body of an image forming apparatus configured to perform an image forming operation, the cartridge includes a first unit including a photosensitive member, and a second unit coupled with the first unit and including a developer bearing member and a force receiving portion, the second unit being configured to be rotatable about a first axis to move with respect to the first unit between a first position where the developer bearing member is in contact with the photosensitive member and a second position where the developer bearing member is separated from the photosensitive member, and the second unit being configured to, when the force receiving portion receives a force from the apparatus main body, be disposed at the first position, wherein, in a state where the first unit is in a same posture as when the image forming operation is performed, the second unit is configured to be disposed at the second position by its own weight, and the developer bearing member is disposed above a horizontal line passing through the first axis, wherein, in a state where the first unit is in the same posture as when the image forming operation is performed and the second unit is at the first position, the developer bearing member is disposed to overlap a vertical line passing through the first axis when seen in a direction of the first axis, wherein, in a state where the first unit is in the same posture as when the image forming operation is performed and where the second unit is at the second position, the developer bearing member is disposed to overlap the vertical line when seen in the direction of the first axis, and wherein, in a state where first unit is in the same posture as when the image forming operation is performed, the force receiving portion is disposed above the horizontal line.

The following is yet another aspect of the present invention. A cartridge to be attached to an apparatus main body of an image forming apparatus, the cartridge includes a first unit including a photosensitive member, the first unit being configured to be supported by the apparatus main body, and a second unit coupled with the first unit and including a developer bearing member and a force receiving portion, the developer bearing member being configured to be rotatable about a second axis, the second unit being configured to be rotatable about a first axis to move with respect to the first unit between a first position where the developer bearing member is in contact with the photosensitive member and a second position where the developer bearing member is separated from the photosensitive member, and the second unit being configured to, when the force receiving portion receives a force from the apparatus main body, be disposed at the first position, wherein, in a state where the first unit is supported by the apparatus main body, the second unit is configured to be disposed at the second position by its own weight, and the developer bearing member is disposed above a horizontal line passing through the first axis, wherein, in a state where the first unit is supported by the apparatus main body and the second unit is at the first position, the developer bearing member is disposed to overlap a vertical line passing through the first axis when seen in a direction of the first axis, wherein, in a state where the first unit is supported by the apparatus main body and where the second unit is at the second position, the developer bearing member is disposed to overlap the vertical line when seen in the direction of the first axis, and wherein, in a state where the first unit is supported by the apparatus main body, the second axis is disposed closer to the photosensitive member than the vertical line when the second unit is at the first position, and the second axis is disposed farther from the photosensitive member than the vertical line when the second unit is at the second position.

The following is yet another aspect of the present invention. A cartridge that is attached to an apparatus main body of an image forming apparatus, the cartridge includes a first unit including a photosensitive member, the first unit being configured to be supported by the apparatus main body, and a second unit coupled with the first unit and including a developer bearing member and a force receiving portion, the second unit being configured to be rotatable about a first axis to move with respect to the first unit between a first position where the developer bearing member is in contact with the photosensitive member and a second position where the developer bearing member is separated from the photosensitive member, and the second unit being configured to, when the force receiving portion receives a force from the apparatus main body, be disposed at the first position, wherein, in a state where the first unit is supported by the apparatus main body, the second unit is configured to be disposed at the second position by its own weight, and the developer bearing member is disposed above a horizontal line passing through the first axis, wherein, in a state where the first unit is supported by the apparatus main body and where the second unit is at the first position, the developer bearing member is disposed to overlap a vertical line passing through the first axis when seen in a direction of the first axis, wherein, in a state where the first unit is supported by the apparatus main body and where the second unit is at the second position, the developer bearing member is disposed to overlap the vertical line when seen in the direction of the first axis, and wherein, in a state where the first unit is supported by the apparatus main body, the force receiving portion is disposed above the horizontal line.

Moreover, the present invention can also be applied to an image forming apparatus including the foregoing cartridge.

Further features of the present invention will become apparent from the following description of exemplary embodiments with reference to the attached drawings.

DESCRIPTION OF THE EMBODIMENTS

First Exemplary Embodiment

An exemplary embodiment of the present invention will be described below with reference to the drawings. Dimensions, materials, shapes, and a relative arrangement of components described in the exemplary embodiment are subject to appropriate changes depending on the configuration and various conditions of apparatuses to which the invention is applied. The following exemplary embodiment is not intended to limit the scope of the invention.

<Overall Configuration of Image Forming Apparatus 100>

An overall configuration of an electrophotographic image forming apparatus 100 (hereinafter, image forming apparatus 100) according to the present exemplary embodiment will be described with reference to FIG. 2.

Figure 2:
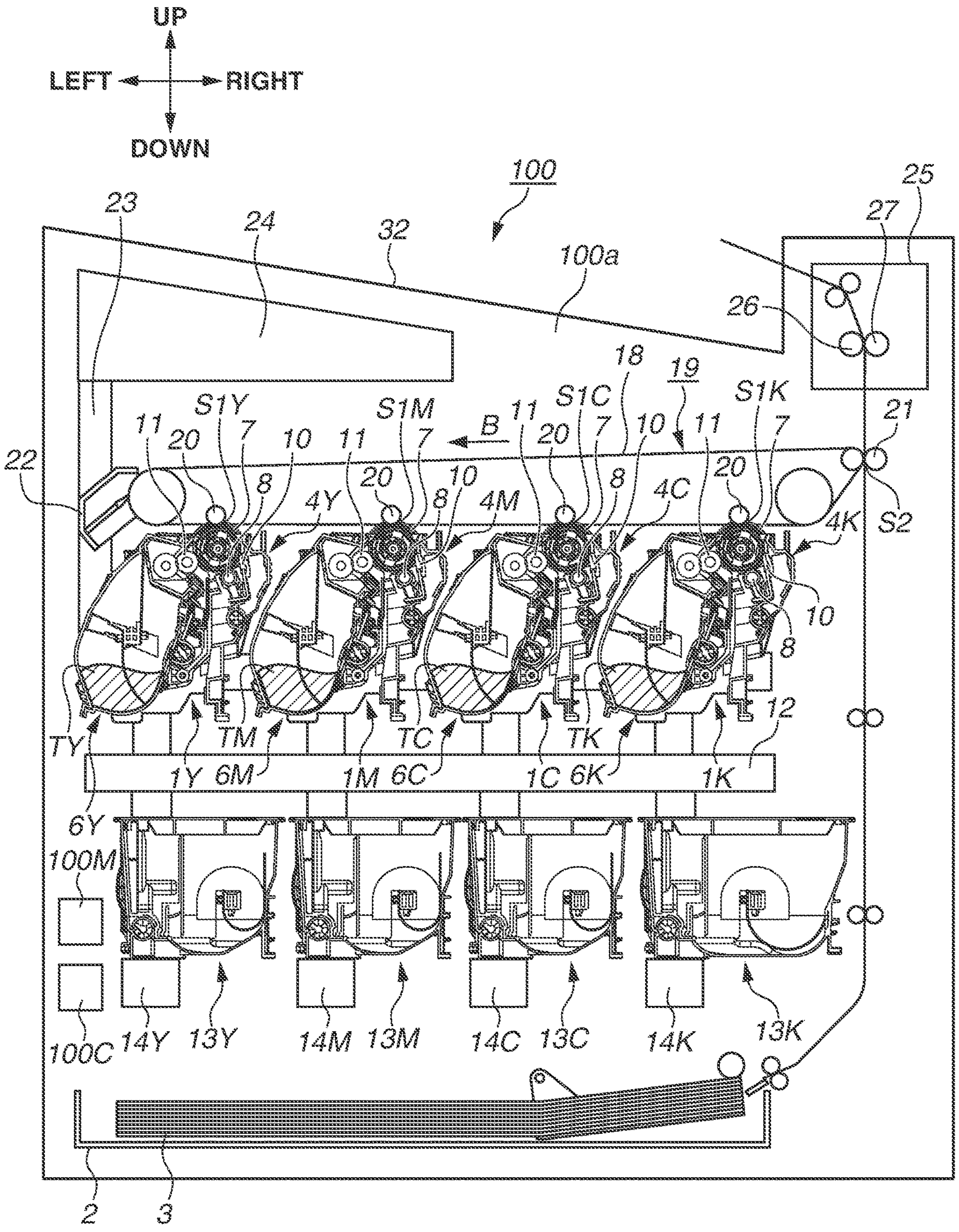
FIG. 2 is a schematic diagram illustrating an image forming apparatus.

FIG. 2 is a schematic diagram illustrating the image forming apparatus 100 according to the present exemplary embodiment. The up and down direction of FIG. 2 indicates the vertical direction of when the image forming apparatus 100 is used (when an image forming operation is performed). The left-to-right direction of FIG. 2 indicates a horizontal direction of when the image forming operation is performed.

The image forming apparatus 100 includes an apparatus main body 100*a*. In the present exemplary embodiment, the image forming apparatus 100 includes process cartridges 1 (1Y, 1M, 1C, and 1K) and toner cartridges 13 (13Y, 13M, 13C, and 13K). The process cartridges 1 (1Y, 1M, 1C, and 1K) and the toner cartridges 13 (13Y, 13M, 13C, and 13K) are detachably attachable to the apparatus main body 100*a*. In other words, the process cartridges 1 (1Y, 1M, 1C, and 1K) and the toner cartridges 13 (13Y, 13M, 13C, and 13K) are detachably attached to the apparatus main body 100*a*.

A first process cartridge 1Y contains a yellow (Y) developer (hereinafter, toner) TY in its developing unit 6. A second process cartridge 1M contains magenta (M) toner TM. A third process cartridge 1C contains cyan (C) toner TC. A fourth process cartridge 1K contains black (K) toner TK.

Each of the process cartridges 1 (1Y, 1M, 1C, and 1K) includes a corresponding one of photosensitive member units 4 (4Y, 4M, 4C, and 4K) and corresponding one of developing units 6 (6Y, 6M, 6C, and 6K) to be described below. Each of the process cartridges 1 (1Y, 1M, 1C, and 1K) transfers toner to an intermediate transfer belt 18 to be described below at a corresponding one of primary transfer portions S1 (S1Y, S1M, S1C, and S1K).

A first toner cartridge 13Y contains yellow (Y) toner. A second toner cartridge 13M contains magenta (M) toner. A third toner cartridge 13C contains cyan (C) toner. A fourth toner cartridge 13K contains black (K) toner.

The toner cartridges 13 (13Y, 13M, 13C, and 13K) are disposed under the process cartridges 1 (1Y, 1M, 1C, and 1K), respectively, containing toner of the respective colors. The toner cartridges 13 (13Y, 13M, 13C, and 13K) replenish the process cartridges 1 (1Y, 1M, 1C, and 1K), respectively, containing toner of the respective colors with the toner.

The process cartridges 1 (1Y, 1M, 1C, and 1K) and the toner cartridges 13 (13Y, 13M, 13C, and 13K) are horizontally arranged.

First to fourth toner conveyance devices 14 (14Y, 14M, 14C, and 14K) are arranged under the toner cartridges 13 (13Y, 13M, 13C, and 13K), respectively. The toner conveyance devices 14 (14Y, 14M, 14C, and 14K) convey respective toners received from the toner cartridges 13 (13Y, 13M, 13C, and 13K) upward and supply the toners to the developing units 6 (6Y, 6M, 6C, and 6K), respectively.

Each of the toner cartridges 13 (13Y, 13M, 13C, and 13K) performs a replenishment operation in a case where a remaining toner level detection unit (not illustrated) provided on the apparatus main body 100*a* detects that a corresponding one of the process cartridges 1 (1Y, 1M, 1C, and 1K) run short of toner.

In the present exemplary embodiment, the first to fourth process cartridges (1Y, 1M, 1C, and 1K) have substantially the same configuration and perform the same operations except that the colors of toner contained therein (color of images to be formed) are different from each other. Similarly, the first to fourth toner cartridges (13Y, 13M, 13C, and 13K) have substantially the same configuration and perform the same operations except that the colors of toner contained therein are different from each other. Similarly, the first to fourth toner conveyance devices (14Y, 14M, 14C, and 14K) have substantially the same configuration and perform the same operations except that the colors of conveying toner are different from each other. In the following description, the suffixes Y to K will therefore be omitted if no particular distinction is needed.

The process cartridges 1 each include a photosensitive member unit (first unit or image bearing member unit) 4 including a photosensitive drum 7, and a developing unit (second unit) 6 including a developing roller 11. The process cartridge 1 includes one photosensitive member unit 4 and one developing unit 6. In other words, the process cartridge 1 includes one photosensitive drum 7 and one developing roller 11.

The photosensitive member unit 4 includes the photosensitive drum 7 serving as an image bearing member (photosensitive member) that bears an electrostatic latent image, and a charging roller 8 serving as a charging member that changes the surface of the photosensitive drum 7. The photosensitive member unit 4 includes a cleaning blade 10 serving as a cleaning member that cleans the photosensitive drum 7. The photosensitive drum 7 rotates by receiving a driving force from the apparatus main body 100*a*.

The developing unit 6 contains toner T. The developing unit 6 includes the developing roller 11 serving as a developing means for developing an electrostatic latent image formed on the photosensitive drum 7. The developing roller 11 is a developer bearing member that bears the toner T and develops the electrostatic latent image formed on the photosensitive drum 7 with the toner T. The developing roller 11 rotates by receiving a driving force from the apparatus main body 100*a*. As will be described below, the photosensitive member unit 4 and the developing unit 6 are swingably coupled.

The process cartridge 1 is configured to be detachably attachable to the apparatus main body 100*a* via attachment units, such as an attachment guide and a positioning member, disposed on the apparatus main body 100*a*. In the present exemplary embodiment, the process cartridge 1 is attached along a direction of a rotation axis of the photosensitive drum 7. In the present exemplary embodiment, the direction of the rotation axis of the photosensitive drum 7 is parallel to a direction of a rotation axis of the developing roller 11. The process cartridge 1 can thus also be said to be attached along the direction of the rotation axis of the developing roller 11.

With the process cartridge 1 attached to the apparatus main body 100*a*, the photosensitive member unit 4 is supported by the positioning member of the apparatus main body 100*a*, and the photosensitive member unit 4 is positioned to the apparatus main body 100*a*. The process cartridge 1 is thereby positioned to the apparatus main body 100*a* in a state where the developing unit 6 is movable with respect to the apparatus main body 100*a* and the photosensitive member unit 4.

The toner cartridges 13 are configured to be detachably attachable to the apparatus main body 100*a* via attachment units, such as a toner cartridge attachment guide and a toner cartridge positioning member disposed on the apparatus main body 100*a*.

A scanner (exposure device) 12 for exposing the photosensitive drums 7 to form electrostatic latent images on the photosensitive drums 7 is disposed under the process cartridges 1. The apparatus main body 100*a* also includes a removed toner conveyance unit 23. The removed toner conveyance unit 23 conveys removed toner removed from the photosensitive drums 7 by the cleaning blades 10 to a removed toner collection container 24. The removed toner conveyance unit 23 is disposed downstream of the process cartridges 1 in a direction of attachment of the process cartridges 1.

An intermediate transfer unit 19 serving as an intermediate transfer member is disposed over the process cartridges 1. The intermediate transfer unit 19 is arranged with the primary transfer portions S1 (S1Y, S1M, S1C, and S1K) facing down.

The intermediate transfer unit 19 includes the intermediate transfer belt 18, primary transfer rollers 20 serving as primary transfer members, a secondary transfer roller 21 serving as a secondary transfer member, and a belt cleaning unit 22. The intermediate transfer belt 18 facing the photosensitive drums 7 is an endless (closed-looped) belt rotatable in a direction of the arrow B, and stretched across a plurality of tension rollers. The primary transfer rollers 20 are disposed along inside the intermediate transfer belt 18. The primary transfer rollers 20 face the photosensitive drums 7 via the intermediate transfer belt 18 to form the primary transfer portions S1. The secondary transfer roller 21 is in contact with the intermediate transfer belt 18 and faces a counter roller via the intermediate transfer belt 18 to form a secondary transfer portion S2. The belt cleaning unit 22 is disposed opposite the secondary transfer portion S2 in the left-to-right direction. More specifically, the belt cleaning unit 22 is disposed downstream of the secondary transfer portion S2 and upstream of the primary transfer portions S1 in a rotation direction of the intermediate transfer belt 18.

A fixing unit 25 is disposed above the intermediate transfer unit 19. The fixing unit 25 includes a heating unit 26 and a pressure roller 27 that is pressed against the heating unit 26. A discharge tray 32 is disposed on the top of the apparatus main body 100*a*. The removed toner collection container 24 is disposed between the discharge tray 32 and the intermediate transfer unit 19. A sheet feed tray 2 for storing recording materials (media or recording media) 3, such as paper is disposed at the bottom of the apparatus main body 100*a*.

In other words, in the image forming apparatus 100, the process cartridges 1 and the scanner 12 are disposed under the intermediate transfer unit 19. The photosensitive drums 7, the developing units 6, and the scanner 12 are thus disposed on the opposite side of the intermediate transfer unit 19 from the fixing unit 25. The photosensitive drums 7, the developing units 6, and the scanner 12 can thus be disposed at positions away from the fixing unit 25. This can prevent the photosensitive drums 7, the developing units 6, and the scanner 12 from being affected by heat from the fixing unit 25.

<Image Forming Operation>

Next, an image forming operation of the image forming apparatus 100 will be described with reference to FIGS. 2 and 3.

Figure 3:
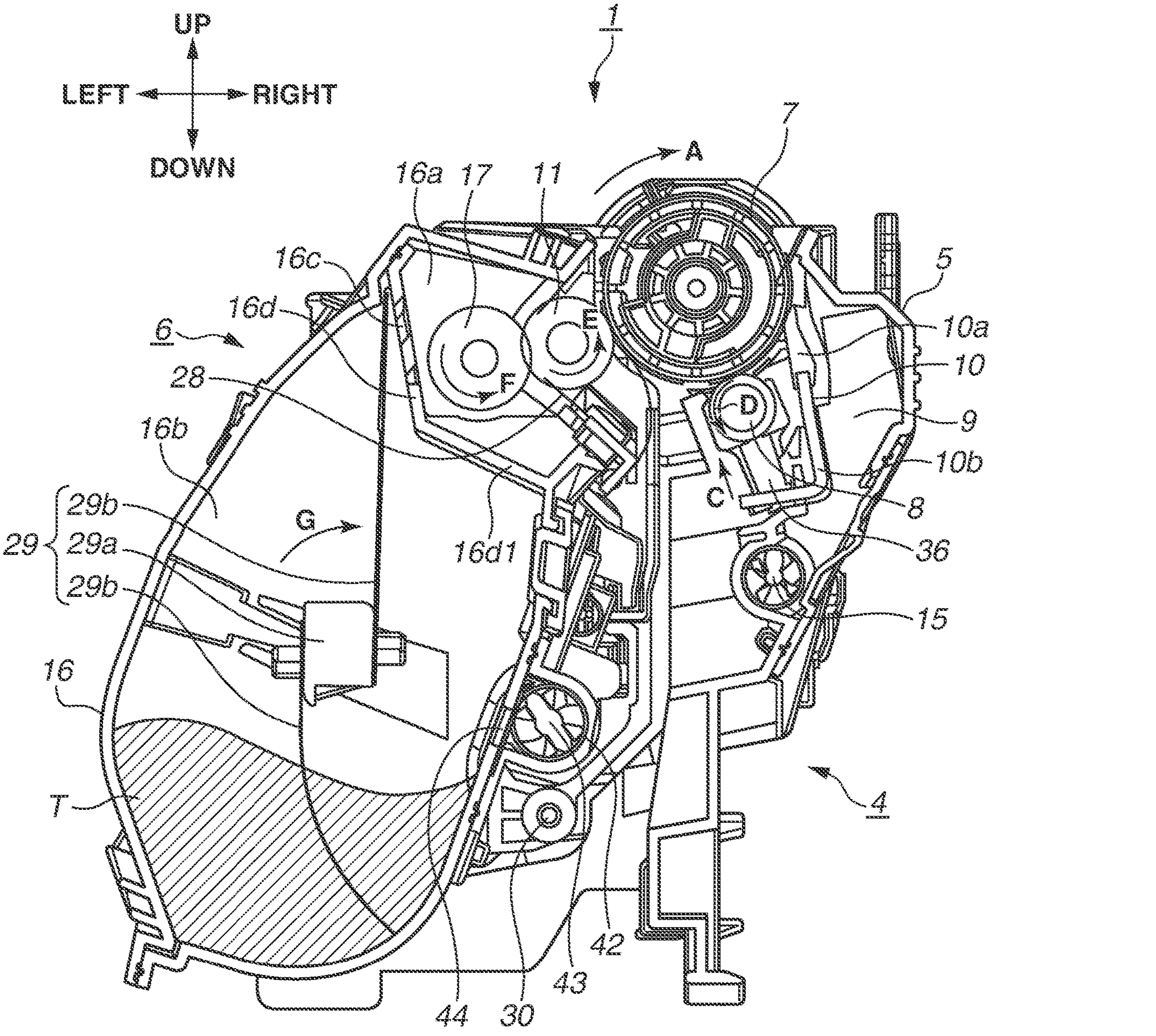
FIG. 3 is a cross-sectional view of the process cartridge.

FIG. 3 is a cross-sectional view of a process cartridge according to the present exemplary embodiment. The up and down direction of FIG. 3 indicates the vertical direction of when the image forming operation is performed. The left-to-right direction of FIG. 3 indicates a horizontal direction of when the image forming operation is performed. In other words, FIG. 3 illustrates the process cartridge 1 in a state where the process cartridge 1 is attached to the apparatus main body 100*a* and an image forming operation is performed.

The apparatus main body 100*a* includes a control unit 100C including a central processing unit (CPU) and a memory, and a driving source 100M including a motor. The control unit 100C performs an image forming operation by controlling the driving source 100M, the scanner 12, etc. In the present exemplary embodiment, the driving source 100M includes a motor that drives a force application unit 101 to be described below. The driving source 100M drives components other than the force application unit 101, such as the photosensitive drums 7, the developing rollers 11, the intermediate transfer belt 18, and a conveyance member for conveying the recording materials 3. The driving source 100M may drive the components using one motor or using a plurality of motors. In a case where an image forming operation is performed, the photosensitive drums 7 are rotated in a direction of the arrow A in FIG. 3. The intermediate transfer belt 18 is driven to rotate in the direction of the arrow B in FIG. 2.

Initially, the surface of the photosensitive drum 7 is uniformly charged by the charging roller 8. Next, the surface of the photosensitive drum 7 is scanned and exposed by laser light emitted from the scanner 12. An electrostatic latent image based on image information is then formed on the surface of the photosensitive drum 7.

The electrostatic latent image formed on the photosensitive drum 7 is developed into a toner image by the developing unit 6. More specifically, the developing roller 11 comes into contact with the photosensitive drum 7, whereby the electrostatic latent image is visualized by the toner T. As will be described below, during an image forming operation, the developing unit 6 is pressed by the force application unit 101 provided on the apparatus main body 100*a*, whereby the developing unit 6 is disposed at an image forming position.

The toner image formed on the photosensitive drum 7 is transferred to the intermediate transfer belt 18 by the primary transfer roller 20 (primary transfer process). In forming a color image, the foregoing image forming operation is performed at the first to fourth primary transfer portions S1Y to S1K in succession. Toner images of the respective colors are thereby formed on the intermediate transfer belt 18. The image forming apparatus 100 can form a monochrome image using one of the first to fourth process cartridges (1Y, 1M, 1C, and 1K). The image forming apparatus 100 can also perform an image forming operation using two or three of the first to fourth process cartridges (1Y, 1M, 1C, and 1K).

Meanwhile, a recording material 3 stored in the sheet feed tray 2 is conveyed to the secondary transfer portion S2. The toner images borne on the intermediate transfer belt 18 are then simultaneously transferred to the recording material 3 by the secondary transfer roller 21 (secondary transfer process).

The recording material 3 to which the toner images are transferred is conveyed to the fixing unit 25. The recording material 3 is heated and pressurized in the fixing unit 25, whereby the toner images are fixed to the recording material 3. The recording material 3 to which the toner images are fixed is discharged to the discharge tray 32.

Toner remaining on the photosensitive drums 7 after the primary transfer process are removed by the cleaning blades 10. Secondary transfer residual toner remaining on the intermediate transfer belt 18 after the secondary transfer process is removed by the belt cleaning unit 22. The toner removed by the cleaning blades 10 and the belt cleaning unit 22 is conveyed by the removed toner conveyance unit 23 and accumulated in the removed toner collection container 24.

<Process Cartridge>

Next, the process cartridge 1 detachably attached to the apparatus main body 100*a* of the image forming apparatus 100 will be described with reference to FIGS. 1, 3, 4A, and 4B.

Figure 1:
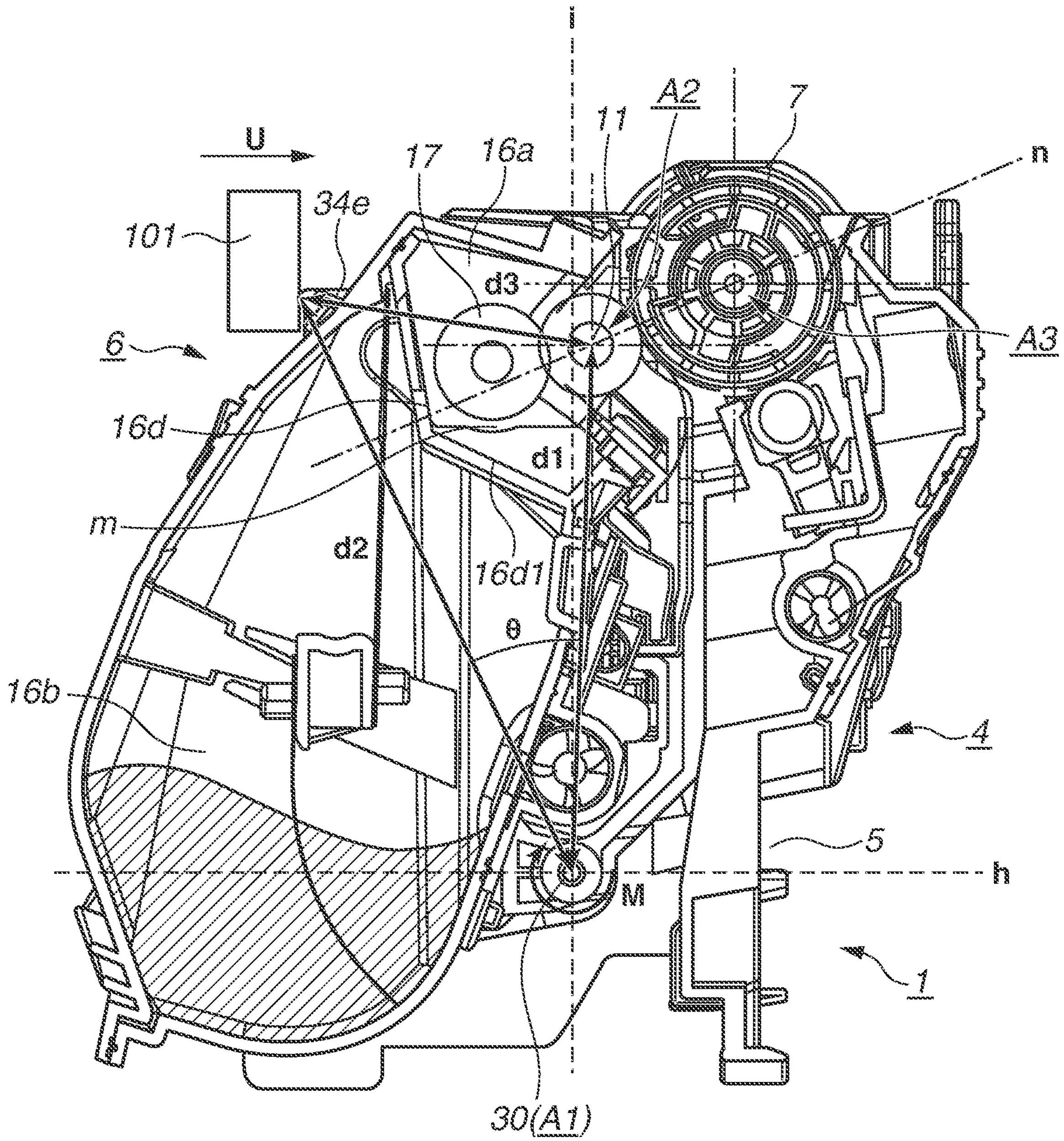
FIG. 1 is a cross-sectional view of a process cartridge.
Figure 4A:
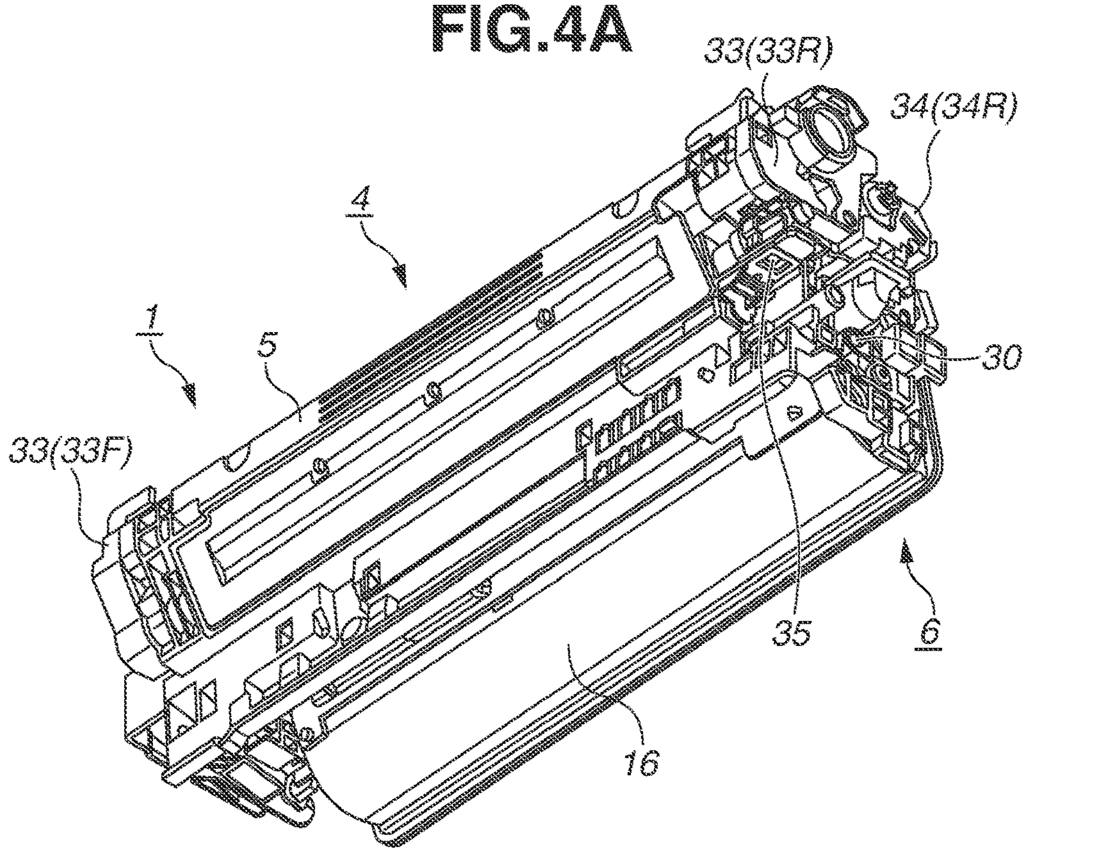
FIG. 4A is a perspective view of the process cartridge seen from a bottom side.
Figure 4B:
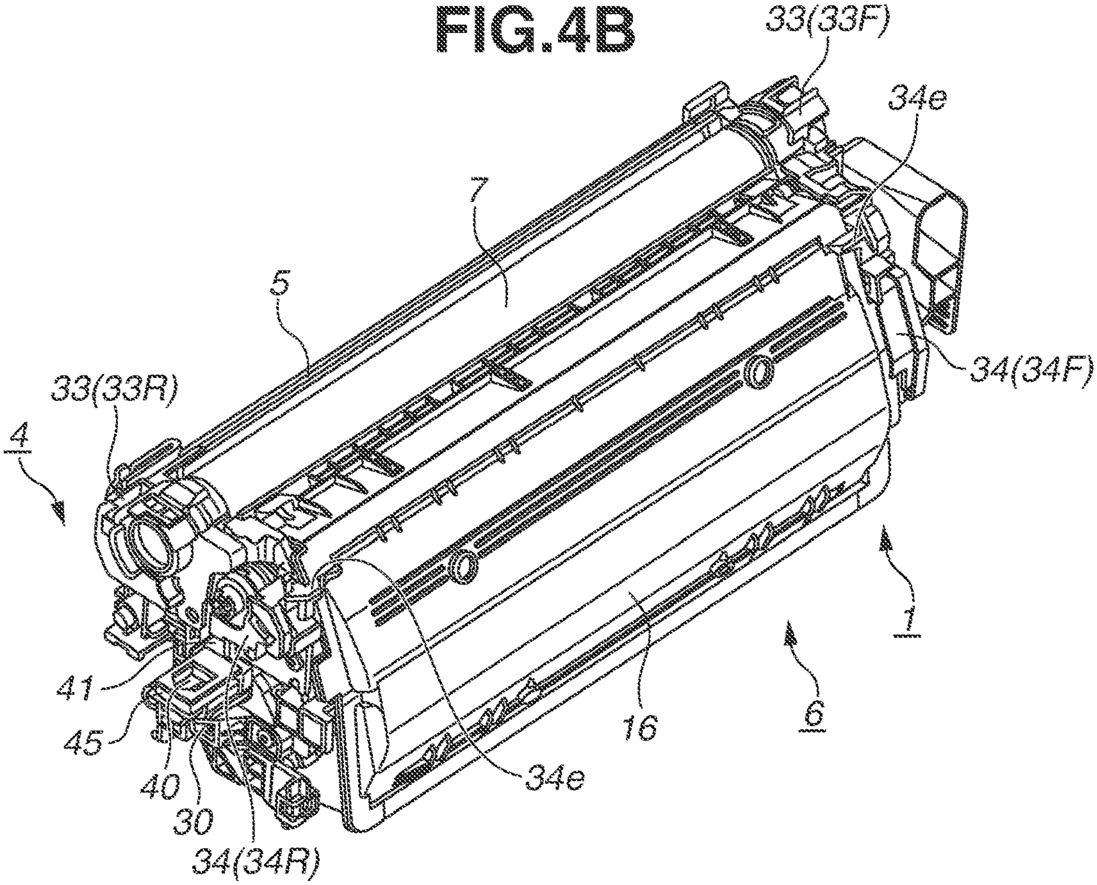
FIG. 4B is a perspective view of the process cartridge seen from a top side.

FIG. 1 is a cross-sectional view of the process cartridge 1 according to the present exemplary embodiment. FIGS. 4A and 4B are perspective views of the process cartridge 1 according to the present exemplary embodiment. FIG. 4A is a perspective view of the process cartridge 1 seen from the bottom side. FIG. 4B is a perspective view of the process cartridge 1 seen from the top side.

FIG. 1 illustrates the process cartridge 1 in a state where the image forming operation is performed. Specifically, the up and down direction of FIG. 1 indicates the vertical direction of when the image forming operation is performed. The left-to-right direction of FIG. 1 indicates a horizontal direction of when the image forming operation is performed. In other words, FIG. 1 illustrates the process cartridge 1 in a state of where the process cartridge 1 is attached to the apparatus main body 100*a* and the image forming operation is performed. FIG. 1 is a view taken along a rotation axis A1 of the developing unit 6 to be described below.

As described above, the process cartridge 1 includes the photosensitive member unit 4 and the developing unit 6. As illustrated in FIGS. 1, 3, 4A, and 4B, the photosensitive member unit 4 and the developing unit 6 are swingably (rotatably) coupled by pins 30 that are coupling spindles. As illustrated in FIG. 1, the developing unit 6 can rotate with respect to the photosensitive member unit 4 about the rotation axis A1.

As illustrated in FIG. 3, the photosensitive member unit 4 includes a first support frame 5 that supports various members of the photosensitive member unit 4 (such as the charging roller 8 and the cleaning blade 10). The photosensitive member unit 4 also includes a removed toner screw 15. The removed toner screw 15 rotates about an axis extending in a direction parallel to the direction of a rotation axis A3 of the photosensitive drum 7.

As illustrated in FIGS. 4A and 4B, the photosensitive member unit 4 includes drum bearings 33 (33F and 33R) that support the photosensitive drum 7. The photosensitive member unit 4 includes a gear train for transmitting drive from the photosensitive drum 7 to the removed toner screw 15. The drum bearing 33R is disposed at one end of the photosensitive member unit 4 in a longitudinal direction of the photosensitive member unit 4 (the same as the direction of the rotation axis A3 of the photosensitive drum 7). The drum bearing 33F is disposed at the other end of the photosensitive member unit 4 in the longitudinal direction of the photosensitive member unit 4. In other words, the photosensitive member unit 4 includes the first support frame 5 and the drum bearings 33 (33F and 33R) as part of a first frame.

In the present exemplary embodiment, the drum bearings 33 (33F and 33R) and the first support frame 5 have a function as to-be-positioned portions that come into contact with positioning portions of the apparatus main body 100*a*. More specifically, the contact of the drum bearings 33 (33F and 33R) with the apparatus main body 100*a* determines the position of the photosensitive drum 7 with respect to the apparatus main body 100*a* in directions orthogonal to the rotation axis A3 of the photosensitive drum 7. The contact of the first support frame 5 with the apparatus main body 100*a* restricts the rotation of the photosensitive member unit 4 with respect to the apparatus main body 100*a* about the rotation axis A3 of the photosensitive drum 7. The position of the photosensitive member unit 4 with respect to the apparatus main body 100*a* in the directions orthogonal to the rotation axis A3 of the photosensitive drum 7 is thereby determined. Moreover, in the present exemplary embodiment, the drum bearing 33R disposed downstream of the process cartridge 1 in the direction of attachment of the process cartridge 1 comes into contact with the apparatus main body 100*a*. The position of the photosensitive member unit 4 with respect to the apparatus main body 100*a* in the direction of the rotation axis A3 of the photosensitive drum 7 is thereby determined. Such a positioning configuration can be modified as appropriate if need. For example, the position of the photosensitive member unit 4 with respect to the apparatus main body 100*a* in the direction of the rotation axis A3 of the photosensitive drum 7 may be determined by the first support frame 5 coming into contact with the apparatus main body 100*a*.

Meanwhile, as illustrated in FIG. 3, the charging roller 8 is biased toward the photosensitive drum 7 in a direction of the arrow C by a spring 36. In the present exemplary embodiment, the charging roller 8 is rotated by the photosensitive drum 7. As the photosensitive drum 7 rotates in the direction of the arrow A, the charging roller 8 rotates in a direction of the arrow D.

The cleaning blade 10 includes a rubber blade 10*a* for removing toner remaining on the surface of the photosensitive drum 7 after the primary transfer process, and a blade support member 10*b* that supports the rubber blade 10*a*. The toner removed from the photosensitive drum 7 by the cleaning blade 10 is accommodated in a removed toner accommodation chamber 9 formed by the cleaning blade 10 and the first support frame 5. The toner accommodated in the removed toner accommodation chamber 9 is conveyed downstream in the direction of attachment of the process cartridge 1 by the removed toner screw 15 disposed in the removed toner accommodation chamber 9. The toner conveyed by the removed toner screw 15 is discharged from a removed toner discharge portion 35 illustrated in FIG. 4A and delivered to the removed toner conveyance unit 23.

As illustrated in FIG. 3, the developing unit 6 includes a developing frame 16. The developing frame 16 includes a partition wall 16*d*. The interior of the developing frame 16 is partitioned into a developing chamber 16*a* and a toner accommodation chamber (developer accommodation chamber) 16*b* by the partition wall 16*d*. The developing chamber 16*a* and the toner accommodation chamber 16*b* communicate with each other through a first communication opening (first opening, or opening) 16*c* formed in the partition wall 16*d*.

As illustrated in FIGS. 4A and 4B, the developing unit 6 includes developing bearings 34 (34F and 34R) serving as bearing members that support the developing roller 11.

The developing roller 11, a supply roller 17, and a developing blade 28 are disposed in the developing chamber 16*a*. In the image forming operation, the developing roller 11 rotates in a direction of the arrow E and is in contact with the photosensitive drum 7 to supply the toner T to the photosensitive drum 7. One end of the developing roller 11 in a longitudinal direction of the developing unit 6 (the same as the direction of the rotation axis of the developing roller 11) is rotatably supported by the developing bearing 34R. The other end of the developing roller 11 in the longitudinal direction of the developing unit 6 is rotatably supported by the developing bearing 34F. In other words, the developing unit 6 includes the developing frame 16 and the developing bearings 34 (34F and 34R) as part of a second frame. In the present exemplary embodiment, the developing frame 16 and the developing bearings 34 (34F and 34R) are made of resin.

As illustrated in FIG. 4B, the developing bearings 34 (34F and 34R) have force receiving portions 34*e* to be described below.

The supply roller (supply member) 17 is rotatably supported by the developing bearings 34 (34F and 34R) to be in contact with the developing roller 11. As illustrated in FIG. 3, in the image forming operation, the supply roller 17 rotates in a direction of the arrow F to supply the toner T to the developing roller 11.

As illustrated in FIG. 3, the developing blade (thickness regulation member, or regulation member) 28 is disposed to be in contact with the surface of the developing roller 11. The developing blade 28 regulates the thickness of the toner layer formed on the surface of the developing roller 11.

As illustrated in FIG. 3, a conveyance member 29 for conveying the toner T accommodated in the toner accommodation chamber 16*b* is disposed in the toner accommodation chamber 16*b*. In the present exemplary embodiment, the conveyance member 29 also has a function as an agitation member for agitating the toner T accommodated in the toner accommodation chamber 16*b*. The conveyance member 29 conveys the toner T accommodated in the toner accommodation chamber 16*b* to the developing chamber 16*a* through the first communication opening 16*c*. In the present exemplary embodiment, the conveyance member 29 is configured to convey the toner T toward the supply roller 17.

As illustrated in FIG. 3, the conveyance member 29 includes a conveyance shaft 29*a* and conveyance sheets 29*b* serving as conveyance units. The conveyance shaft 29*a* rotates about a rotation axis parallel to a rotation axis A2 of the developing roller 11. The conveyance sheets 29*b* are flexible sheets. One end of each of the conveyance sheets 29*b* is attached to the conveyance shaft 29*a*. The other end of each of the conveyance sheets 29*b* is a free end. As the conveyance shaft 29*a* and the conveyance sheets 29*b* rotate in a direction of the arrow G, the conveyance sheets 29*b* are brought into contact with the inner wall of the toner accommodation chamber 16*b* and deformed. Further rotation of the conveyance shaft 29*a* releases the conveyance sheets 29*b* from the deformation. The toner T is conveyed to the developing chamber 16*a* by the release of the conveyance sheets 29*b* from the deformation.

As illustrated in FIG. 1, in the present exemplary embodiment, the developing chamber 16*a* is disposed above the toner accommodation chamber 16*b* in a posture where the process cartridge 1 is attached to the apparatus main body 100*a*. In the present exemplary embodiment, the developing chamber 16*a* is disposed above the toner accommodation chamber 16*b* in a state where the developing unit 6 is at the image forming position to be described below. Moreover, in the present exemplary embodiment, the developing chamber 16*a* is also disposed above the toner accommodation chamber 16*b* in a state where the developing unit 6 is at a separation position to be described below.

More specifically, in the horizontal direction, the developing chamber 16*a* and the toner accommodation chamber 16*b* overlap in position at least in part. In the vertical direction, at least a part of the developing chamber 16*a* is disposed above (directly above) at least a part of the toner accommodation chamber 16*b*. The conveyance member 29 therefore lifts the toner in the toner accommodation chamber 16*b* upward and supplies the toner to the developing chamber 16*a* through the first communication opening 16*c*.

As illustrated in FIG. 4B, the developing unit 6 has a toner inlet 40 for accepting toner T from the toner conveyance device 14. The toner inlet 40 is disposed downstream of the developing unit 6 in the direction of attachment of the process cartridge 1. An inlet seal 45 and a movable inlet shutter 41 are disposed over the toner inlet 40. When the process cartridge 1 is not attached to the apparatus main body 100*a*, the toner inlet 40 is closed by the inlet shutter 41. The inlet shutter 41 is configured to be biased to open by the apparatus main body 100*a* of the image forming apparatus 100 in an interlocking manner with the attaching operation of the process cartridge 1.

As illustrated in FIG. 3, the developing unit 6 includes a replenishing toner conveyance channel 42 communicating with the toner inlet 40. A replenishing toner conveyance screw 43 is disposed in the replenishing toner conveyance channel 42. The developing unit 6 further has a second communication opening (second opening) 44 through which the replenishing toner conveyance channel 42 communicates with the toner accommodation chamber 16*b*. The second communication opening 44 is disposed near the center of the developing unit 6 in the longitudinal direction of the developing unit 6.

The replenishing toner conveyance screw 43 extends in parallel with the direction of the rotation axis of the developing roller 11, and conveys the toner T received via the toner inlet 40 to the toner accommodation chamber 16*b* through the second communication opening 44.

<Coupling Between Photosensitive Member Unit and Developing Unit>

Figure 5:
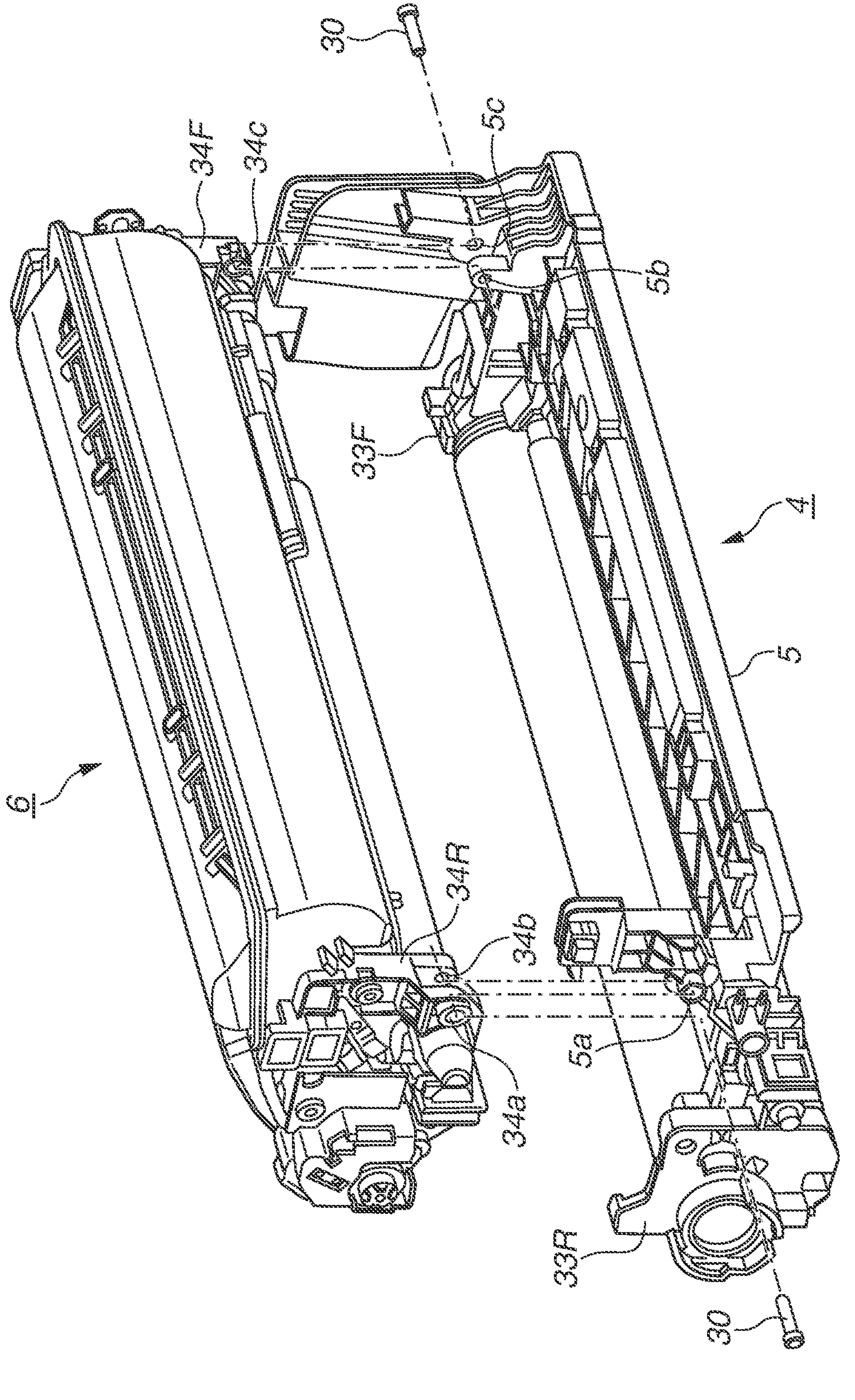
FIG. 5 is an exploded perspective view illustrating a coupling of a photosensitive member unit with a developing unit.

The coupling between the photosensitive member unit 4 and the developing unit 6 will be described with reference to FIG. 5. FIG. 5 is an exploded perspective view illustrating the coupling between the photosensitive member unit and the developing unit according to the present exemplary embodiment.

In the present exemplary embodiment, the longitudinal direction of the process cartridge 1 is the same as the direction of the rotation axis A2 (second axis, or developing axis) of the developing roller 11 and the direction of the rotation axis A3 (third axis, or image bearing member axis) of the photosensitive drum 7. The longitudinal direction of the process cartridge 1 is the same as the longitudinal direction of the photosensitive member unit 4 and the longitudinal direction of the developing unit 6. The developing bearing 34R and the drum bearing 33R are disposed at one end of the process cartridge 1 in the longitudinal direction of the process cartridge 1. The developing bearing 34F and the drum bearing 33F are disposed at the other end. The developing roller 11 and the photosensitive drum 7 are configured to receive a driving force from the apparatus main body 100*a* at one end of the process cartridge 1. In other words, the one end side of the process cartridge 1 can be referred to as a driving side. The other end side of the process cartridge 1 can be referred to as a non-driving side.

As illustrated in FIG. 5, the first support frame 5 of the photosensitive member unit 4 has holes 5*a*, 5*b*, and 5*c*. The hole 5*a* is disposed at the one end side of the first support frame 5 in the longitudinal direction of the process cartridge 1. The holes 5*b* and 5*c* are disposed at the other end side of the first support frame 5.

Meanwhile, the developing bearing 34F has a hole 34*c*. The developing bearing 34R has holes 34*a* and 34*b*.

The pins 30 are disposed at the one end side and the other end side of the process cartridge 1. The pins 30 have a cylindrical shape including a large diameter portion and a small diameter portion. At one end side of the process cartridge 1, a pin 30 is engaged with the holes 34*a*, 5*a*, and 34*b* so that the hole 5*a* is disposed between the holes 34*a* and 34*b*. At the other end side of the process cartridge 1, another pin 30 is engaged with the holes 5*b*, 34*c*, and 5*c* so that the hole 34*c* is disposed between the holes 5*b* and 5*c*. The developing unit 6 is thereby coupled with the photosensitive member unit 4 to be rotatable (swingable) about the rotation center (swing center).

In the present exemplary embodiment, the rotation axis (first axis, or unit axis) A1 of the developing unit 6 illustrated in FIG. 1 agrees with axes of the pins 30. Moreover, in the present exemplary embodiment, the direction of the rotation axis A1 of the developing unit 6 is parallel to the direction of the rotation axis A2 of the developing roller 11 and that of the rotation axis A3 of the photosensitive drum 7. In the present exemplary embodiment, when seen along the rotation axis A1 of the developing unit 6, the pin 30 disposed at the one end side of the process cartridge 1 is coaxial with the pin 30 disposed at the other end side of the process cartridge 1. The developing unit 6 is inseparably coupled with the photosensitive member unit 4. In a state where the process cartridge 1 is detached from the apparatus main body 100*a*, movement of the developing unit 6 with respect to the photosensitive member unit 4 in the direction of the rotation axis A1 is thus restricted. Moreover, while the developing unit 6 can rotate with respect to the photosensitive member unit 4 about the rotation axis A1, translation of the developing unit 6 with respect to the photosensitive member unit 4 in directions intersecting the rotation axis A1 is restricted.

<Movement of Developing Unit>

Figure 6A:
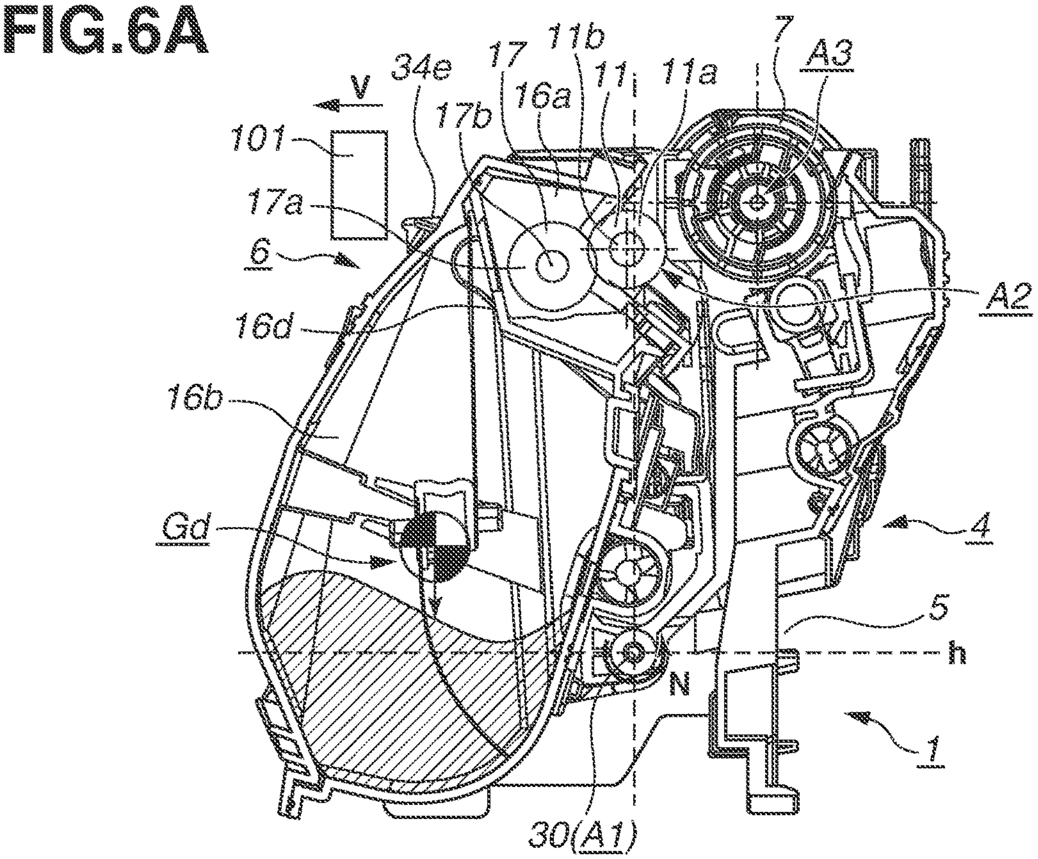
FIG. 6A is a cross-sectional view of the process cartridge when the developing unit is at a separation position.
Figure 6B:
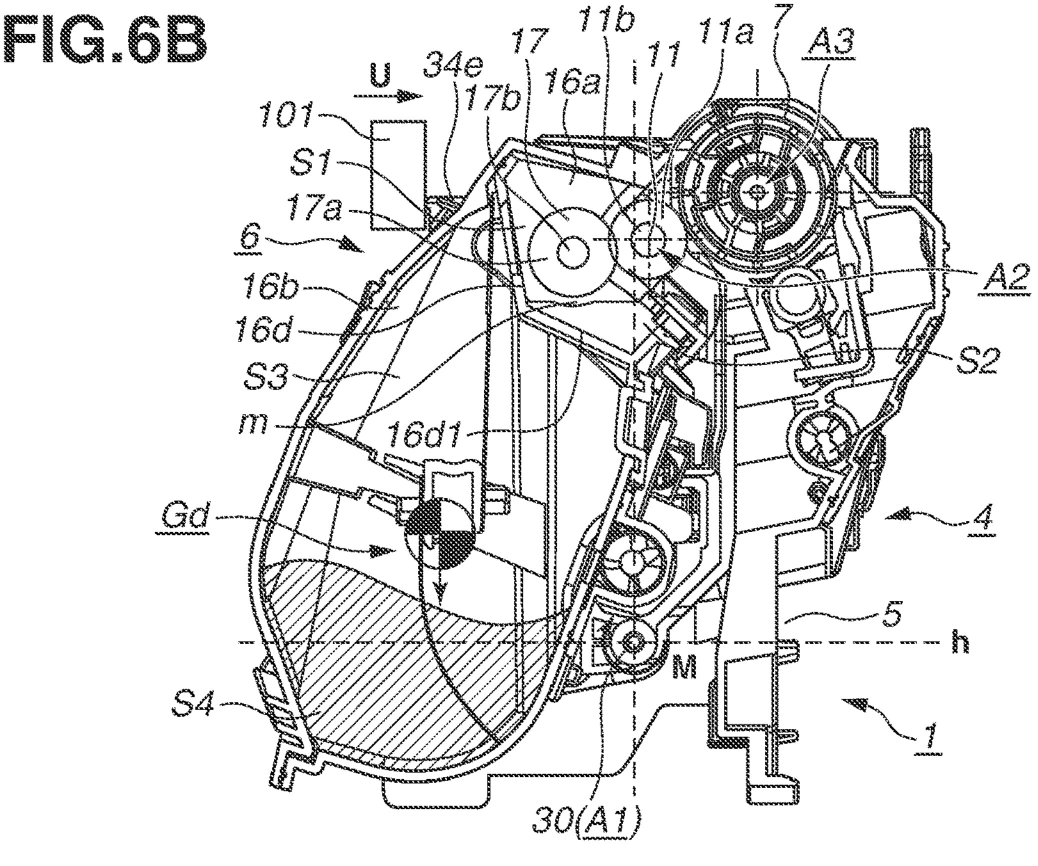
FIG. 6B is a cross-sectional view of the process cartridge when the developing unit is at an image forming position.

The movement of the developing unit 6 with respect to the photosensitive member unit 4 will be described with reference to FIGS. 1, 6A, and 6B. FIGS. 6A and 6B are cross-sectional views for describing the movement of the developing unit 6 according to the present exemplary embodiment. FIG. 6A is a cross-sectional view of the process cartridge 1 in a state where the developing unit 6 is at the separation position. FIG. 6B is a cross-sectional view of the process cartridge 1 in a state where the developing unit 6 is at the image forming position. In FIGS. 6A and 6B, the photosensitive member unit 4 is in a state of being supported by apparatus main body 100*a* and in a posture of when the image forming operation is performed. Like FIGS. 1 and 3, FIGS. 6A and 6B are cross-sectional views of the process cartridge 1 seen in the direction of the rotation axis A1 of the developing unit 6. The up and down direction of FIGS. 6A and 6B indicates the vertical direction in a state where the photosensitive member unit 4 is in a supported posture to be described below. The left-to-right direction indicates the horizontal direction in a state where the photosensitive member unit 4 is in the supported posture.

The developing unit 6 is coupled with the photosensitive member unit 4 and configured to be rotatable with respect to the photosensitive member unit 4 about the rotation axis A1. As the developing unit 6 rotates about the rotation axis A1, the developing unit 6 moves with respect to the photosensitive member unit 4 between the image forming position illustrated in FIG. 6B and the separation position illustrated in FIG. 6A.

The image forming position (first position) of the developing unit 6 can be referred to as a position of when the developing roller 11 develops an electrostatic latent image on the photosensitive drum 7. The image forming position of the developing unit 6 can also be referred to as a position of when the distance between the developing roller 11 and the photosensitive drum 7 is smallest. In the present exemplary embodiment, the developing roller 11 is in contact with the photosensitive drum 7 when the developing unit 6 is at the image forming position. The developing roller 11 is separated from the photosensitive drum 7 when the developing unit 6 is at the separation position (second position). In other words, the separation position of the developing unit 6 can be said to be a position of when the distance between the developing roller 11 and the photosensitive drum 7 is longer than when the developing unit 6 is at the image forming position.

As described above, the rotation of the developing unit 6 about the rotation axis A1 brings the developing unit 6 into the image forming position and the separation position with respect to the photosensitive member unit 4.

In a state where the photosensitive member unit 4 is supported by the apparatus main body 100*a*, the developing unit 6 is disposed at the separation position by its own weight. More specifically, the developing unit 6 is disposed at the separation position by its own weight when the photosensitive member unit 4 is in the same posture as when supported by the apparatus main body 100*a* (supported posture). In other words, the developing unit 6 is disposed at the separation position by its own weight when the photosensitive member unit 4 is in the same posture as when the image forming operation is performed (image forming posture). In the present exemplary embodiment, the supported posture of the photosensitive member unit 4 and the image forming posture of the photosensitive member unit 4 are the same. In the present exemplary embodiment, a part of the photosensitive drum 7 is exposed above the process cartridge 1 when the photosensitive member unit 4 is in the supported posture.

Note that the developing unit 6 does not need to be disposed at the separation position only by its own weight. In other words, the process cartridge 1 may be configured so that the developing unit 6 is naturally disposed at the separation position when the photosensitive member unit 4 is in the supported posture.

More specifically, with the own weight of the developing unit 6 when the photosensitive member unit 4 is in the supported posture and the internal force of the process cartridge 1 put together, a force biasing the developing unit 6 toward the separation position is greater than a force biasing the developing unit 6 toward the image forming position. For example, the process cartridge 1 may include a member that produces a force for biasing the developing unit 6 toward the separation position or a member that produces a force for biasing the developing unit 6 toward the image forming position. In either case, the developing unit 6 takes the separation position of its own accord when the process cartridge 1 is oriented in a manner such that the photosensitive member unit 4 is in the supported posture. In other words, the developing unit 6 is moved from the image forming position to the separation position at least by its own weight when the photosensitive member unit 4 is in the supported posture.

As illustrated in FIGS. 6A and 6B, the own weight of the developing unit 6 (in the direction of the arrow) acts on the center of gravity Gd of the developing unit 6. In a state where the photosensitive member unit 4 is in the supported posture, the own weight of the developing unit 6 acting on the center of gravity Gd produces force (moment about the rotation axis A1) in a direction in which the developing roller 11 moves away from the photosensitive drum 7.

As illustrated in FIGS. 6A and 6B, in a state where the photosensitive member unit 4 is in the supported posture, the center of gravity Gd is disposed vertically above a horizontal line (horizontally extending line) h passing through the rotation axis A1 of the developing unit 6. The photosensitive drum 7, the developing roller 11, the supply roller 17, the developing chamber 16*a*, and the partition wall 16*d* are also disposed above the horizontal line h. The rotation axis A2 of the developing roller 11 is disposed vertically below the rotation axis A3 of the photosensitive drum 7. The center of gravity Gd is disposed vertically below the photosensitive drum 7, the developing roller 11, the supply roller 17, the developing chamber 16*a*, and the partition wall 16*d*.

The center of gravity Gd is disposed horizontally across a vertical line (vertically extending line, or line perpendicular to the horizontal line h) i passing through the rotation axis A1 of the developing unit 6 from the photosensitive drum 7. That is, the photosensitive drum 7 is disposed on one side with respect to the vertical line i, and the center of gravity Gd is disposed on the other side with respect to the vertical line i. In other words, the center of gravity Gd is disposed farther from the photosensitive drum 7 than is the vertical line i. In the present exemplary embodiment, like the center of gravity Gd, the supply roller 17 is also disposed farther from the photosensitive drum 7 than is the vertical line i. Such an arrangement with respect to the vertical line i can facilitate the developing unit 6 being disposed at the separation position by its own weight.

As employed herein, a state where the gravity and the internal force of the process cartridge 1 act on the developing unit 6 and no external force other than the gravity acts on the developing unit 6 will be referred to as a natural state of the process cartridge 1. If the process cartridge 1 includes a biasing member for biasing the developing unit 6, the force from the biasing member is included in the internal force.

In a state where the photosensitive member unit 4 is in the supported posture and the process cartridge 1 is in the natural state, the force acting on the developing unit 6 in a direction of bringing the developing roller 11 away from the photosensitive drum 7 is greater than the force acting in a direction of bringing the developing roller 11 closer to the photosensitive drum 7. This makes the force biasing the developing unit 6 toward the separation position greater than the force biasing the developing unit 6 toward the image forming position, and the developing unit 6 is thus naturally disposed at the separation position.

In the present exemplary embodiment, the developing unit 6 is disposed at the separation position by its own weight. In other words, the own weight component of the developing unit 6 in the force acting in the direction of bringing the developing roller 11 away from the photosensitive drum 7 is greater than the force acting in the direction of bringing the developing roller 11 closer to the photosensitive drum 7 in the internal force of the process cartridge 1.

Moreover, in the present exemplary embodiment, the process cartridge 1 does not include a member that produces a force acting in the direction of bringing the developing roller 11 closer to the photosensitive drum 7 (force biasing the developing unit 6 toward the image forming position). The internal force of the process cartridge 1 thus includes zero force acting in the direction of bringing the developing roller 11 closer to the photosensitive drum 7.

In a state where the process cartridge 1 thus inserted into the apparatus main body 100*a*, the developing unit 6 is naturally disposed at the separation position. The developing unit 6 stands by at the separation position when the image forming operation is not performed. This can prevent contact between the developing roller 11 and the photosensitive drum 7 and prevent the surface layer of the developing roller 11 from deformation, even when the process cartridge 1 is left unused for a long time.

In a case where, unlike the process cartridge 1 according to the present exemplary embodiment, the developing roller 11 is brought into contact with the photosensitive drum 7 by a spring included in the cartridge, the spring needs to produce a force for pressing the developing roller 11 against the photosensitive drum 7 in addition to the force for the weight of the developing unit 6. In the cartridge using such a spring, the amount of deformation of the spring also increases when the developing unit 6 is moved in the direction of separating the developing roller 11 from the photosensitive drum 7. This makes the spring force greater when the developing roller 11 is separated from the photosensitive drum 7 than when the developing roller 11 is in contact with the photosensitive drum 7, and consequently the cartridge can be deformed. By contrast, with the configuration according to the present exemplary embodiment, the process cartridge 1 does not need to include such a spring and deformation of the process cartridge 1 can be reduced.

Meanwhile, as illustrated in FIGS. 6A and 6B, the apparatus main body 100*a* includes the force application unit 101 as a part of the apparatus main body 100*a*. The developing unit 6 includes the force receiving portions 34*e* that comes into contact with the force application unit 101 and receives force from the force application unit 101. The control unit 100C controls the driving source 100M to control the operation of the force application unit 101 by the driving source 100M. During image formation, the force application unit 101 driven by the driving source 100M applies force to and moves the force receiving portions 34*e*. During non-image formation (including the attaching and detaching operations of the process cartridge 1), the force application unit 101 moves away from the force receiving portions 34*e*. The contact operation and separation operation of the developing roller 11 by the movement of the force application unit 101 are desirably performed in a state where the photosensitive drum 7 is rotating, more desirably in a state where the photosensitive drum 7 and the developing roller 11 are rotating.

The force receiving portions 34*e* are protrusions protruding in a direction orthogonal to the rotation axis A1 and away from the rotation axis A1, and are configured to come into contact with the force application unit 101 at their tips. In the present exemplary embodiment, the protrusions have curved tips. This facilitates stabilizing the positions where the force application unit 101 and the force receiving portions 34*e* are in contact with each other. The force application unit 101 can thus stably push the force receiving portions 34*e*.

The force receiving portions 34*e* are disposed at both ends of the developing unit 6 in the direction of the rotation axis A2 of the developing roller 11. In the present exemplary embodiment, the force receiving portions 34*e* are disposed on the developing bearings 34R and 34F including support portions for supporting the developing roller 11 (see FIG. 4B). In the present exemplary embodiment, the support portions for supporting the developing roller 11 and the force receiving portions 34*e* are disposed to overlap in position in the direction of the rotation axis A1 of the developing unit 6. The force application unit 101 can thus efficiently press the developing roller 11 against the photosensitive drum 7. In addition, the force receiving portions 34*e* disposed on the components supporting the developing roller 11 (developing bearings 34R and 34F) can increase the positional precision of the force receiving portions 34*e* with respect to the developing roller 11. In the present exemplary embodiment, the positional precision of the force receiving portions 34*e* with respect to the developing roller 11 can also be increased easily since the distance between the developing roller 11 and the force receiving portions 34*e* is small as will be described below.

The force application unit 101 is configured to be movable in a direction of getting away from the developing unit 6 (retraction direction, or direction of an arrow V) and a direction of approaching the developing unit 6 (pressurization direction, or direction of an arrow U). The force application unit 101 can move between a position where the force application unit 101 is separated from the force receiving portions 34*e* of the developing unit 6 (FIG. 6A) and a position where the force application unit 101 is in contact with the force receiving portions 34*e* of the developing unit 6 (FIG. 6B). The developing unit 6 is disposed at the image forming position by the force receiving portions 34*e* receiving force from the force application unit 101.

As illustrated in FIG. 6B, in the image forming operation, the force application unit 101 moves in the pressurization direction and comes into contact with the force receiving portions 34*e*. The force receiving portions 34*e* receive force from the force application unit 101, and the developing unit 6 rotates in a direction of an arrow M about the pins 30 (rotation axis A1). The developing unit 6 is thereby disposed at the image forming position. In this state, the developing roller 11 is in contact with the photosensitive drum 7.

As illustrated in FIG. 6A, when the image forming operation ends, the force application unit 101 moves in the retraction direction and is separated away from the force receiving portions 34*e*. The developing unit 6 is rotated in a direction of the arrow N about the pins 30 (rotation axis A1) by the own weight of the developing unit 6. The developing unit 6 is thereby disposed at the separation position. In this state, the developing roller 11 is separated from the photosensitive drum 7.

As described above, the developing unit 6 is moved from the image forming position to the separation position by its own weight. When the force application unit 101 moves in the direction of the arrow V in a state where the developing unit 6 is at the image forming position, the developing unit 6 moves naturally (automatically) toward the separation position. The force application unit 101 is then separated from the force receiving portions 34*e* and the developing unit 6 is disposed at the separation position.

As described above, the movement of the developing unit 6 from the image forming position to the separation position does not need to be performed only by the own weight. Specifically, as will be described below, the process cartridge 1 may include a biasing member 50 that biases the developing unit 6 from the image forming position toward the separation position.

Since the developing unit 6 is naturally disposed at the separation position, the force application unit 101 of the apparatus main body 100*a* can be kept separated from the process cartridge 1 when the image forming operation is not performed. In other words, the force application unit 101 of the apparatus main body 100*a* can be prevented from receiving a force from the process cartridge 1 when the image forming operation is not performed. The force application unit 101 and the portions supporting the same can thus be prevented from deformation. The configuration according to the present exemplary embodiment can effectively prevent the force application unit 101 and the portions supporting the same from deformation since the period when the image forming operation is not performed is generally longer than the period when the image forming operation is performed.

<Arrangement of Force Receiving Portions>

The arrangement of the force receiving portions 34*e* according to the present exemplary embodiment will be described with reference to FIGS. 1, 6A, and 6B. As described above, FIG. 1 is a cross-sectional view of the process cartridge 1 in a state where the developing unit 6 is at the image forming position. In FIG. 1, the photosensitive member unit 4 is supported by the apparatus main body 100*a* and is in the posture in the image forming operation. FIG. 1 is a view of the process cartridge 1 seen along the rotation axis A1 of the developing unit 6.

As illustrated in FIG. 1, the force receiving portions 34*e* and the developing roller 11 are disposed above the horizontal line h passing through the rotation axis A1 of the developing unit 6.

As illustrated in FIG. 1, the distance between the rotation axis A1 of the developing unit 6 and the rotation axis A2 of the developing roller 11 in a direction orthogonal to the rotation axis A1 of the developing unit 6 is denoted by d1 (second distance). The distance between the rotation axis A1 of the developing unit 6 and the force receiving portions 34*e* (portions to make contact with the force application unit 101) is denoted by d2 (third distance). The distance between the force receiving portions 34*e* and the rotation axis A2 of the developing roller 11 is denoted by d3 (first distance). d1, d2, and d3 are the same as the lengths of the respective lines connecting the points (the rotation axis A1 of the developing unit 6, the rotation axis A2 of the developing roller 11, and the force receiving portions 34*e*). In the present exemplary embodiment, the direction orthogonal to the rotation axis A1 of the developing unit 6 is the same as the direction orthogonal to the rotation axis A2 of the developing roller 11.

To reduce deformation of the force application unit 101, the force receiving portions 34*e*, and the periphery thereof, the force that the force application unit 101 applies to the force receiving portions 34*e* is desirably small. To provide force needed to maintain the developing unit 6 at the image forming position and reduce the force by which the force application unit 101 presses the force receiving portions 34*e*, d2 is desirably long.

On the other hand, to reliably separate the developing roller 11 from the photosensitive drum 7 even with a small amount of rotation of the developing unit 6, d1 is desirably long. In particular, the longer d2, the longer the moving distance of the force receiving portions 34*e* when the developing unit 6 is rotated. To reduce the moving distances of the force application unit 101 and the force receiving portions 34*e*, the amount of rotation of the developing unit 6 is thus desirably small.

In other words, d1 and d2 are determined in consideration of the magnitude of the force applied to the force receiving portions 34*e* or the rotation angle of the developing unit 6. Meanwhile, to reduce the area that the process cartridge 1 occupies in the image forming apparatus 100 in directions orthogonal to the rotation axis A1 of the developing unit 6, the arrangement space of the developing roller 11, the rotation axis A1, and the force receiving portions 34*e* is desirably small.

For this reason, d3 (the distance between the rotation axis A2 of the developing roller 11 and the force receiving portions 34*e*) is desirably shorter than the longer one of d1 and d2. d3 is more desirably shorter than d1 and d2.

In the present exemplary embodiment, the components are arranged so that θ<60°, where θ is the angle formed between d1 and d2. With such an arrangement, d3 becomes shorter than the longer one of the distances d1 and d2.

In the process cartridge 1 according to the present exemplary embodiment, d3 is shorter than d1. Moreover, d3 is shorter than d2. In other words, the developing roller 11, the rotation axis A1, and the force receiving portions 34*e* are arranged so that d3<d1 and d3<d2. In the present exemplary embodiment, the developing roller 11, the rotation axis A1, and the force receiving portions 34*e* are also arranged so that d1<d2.

To reduce the arrangement space of the developing roller 11, the rotation axis A1, and the force receiving portions 34*e*, the angle θ formed between the line (first line) connecting the rotation axis A1 and the rotation axis A2 of the developing roller 11 and the line (second line) connecting the rotation axis A1 and the force receiving portions 34*e* is less than 60° when seen along the rotation axis A1. θ is more desirably less than 45°, and even more desirably less than 30°. In the present exemplary embodiment, θ is less than 30°.

In the present exemplary embodiment, both the force receiving portions 34*e* and the developing roller 11 are disposed above the horizontal line passing through the rotation axis A1. With this configuration, d1 and d2 become long. The biasing force of the force application unit 101 can thus be reduced.

When seen along the rotation axis A1, the force receiving portions 34*e* are disposed on the side across a line n, passing through the rotation axis A3 of the photosensitive drum 7 and the rotation axis A2 of the developing roller 11, from the pin 30 (opposite from the rotation axis A1). In other words, the components are arranged so that the line n passes between the rotation axis A1 and the force receiving portions 34*e*. With this configuration, the space for arranging the force receiving portions 34*e*, the developing roller 11, and the rotation axis A1 can be reduced while the pressing force of the force application unit 101 is reduced.

As illustrated in FIGS. 6A and 6B, the force receiving portions 34*e* are disposed so that the force receiving portions 34*e* overlap the photosensitive drum 7 in position in the vertical direction.

With such a configuration, the space of the process cartridge 1 in the directions orthogonal to the rotation axis A1 can be reduced. Moreover, the force of the force application unit 101 (the force for the force receiving portions 34*e* to receive) can be reduced. In other words, the developing unit 6 can be disposed at the image forming position with small force. Furthermore, the developing roller 11 can be reliably separated from the photosensitive drum 7 even in a case where the rotation angle of the developing unit 6 is small.

The force receiving portions 34*e* are disposed above a bottommost portion 16*d*1 of the partition wall 16*d*. In other words, the developing chamber 16*a* overlaps the force receiving portions 34*e* in position in the vertical direction.

The process cartridge 1 and another process cartridge different from the process cartridge 1 in the capacity of the toner accommodation chamber 16*b* can be attached to the apparatus main body 100*a*. With the foregoing arrangement of the force receiving portions 34*e*, the force application unit 101 can be disposed at the same position even if process cartridges including different sizes of toner accommodation chambers 16*b* are attached. Such an arrangement also improves the degree of freedom in modifying the shape of the toner accommodation chamber 16*b* compared to a case where the force receiving portions 34*e* are disposed below the developing chamber 16*b*. In other words, the shape of the developing frame 16 forming the toner accommodation chamber 16*b* below the force receiving portions 34*e* can be freely modified based on the capacity of the toner accommodation chamber 16*b* without restriction from the arrangement of the force receiving portions 34*e*.

<Positional Relationship Between Rotation Axis and Center of Gravity of Developing Unit>

Next, a positional relationship between the rotation axis A1 and the center of gravity Gd of the developing unit 6 will be described with reference to FIGS. 7A and 7B.

Figure 7A:
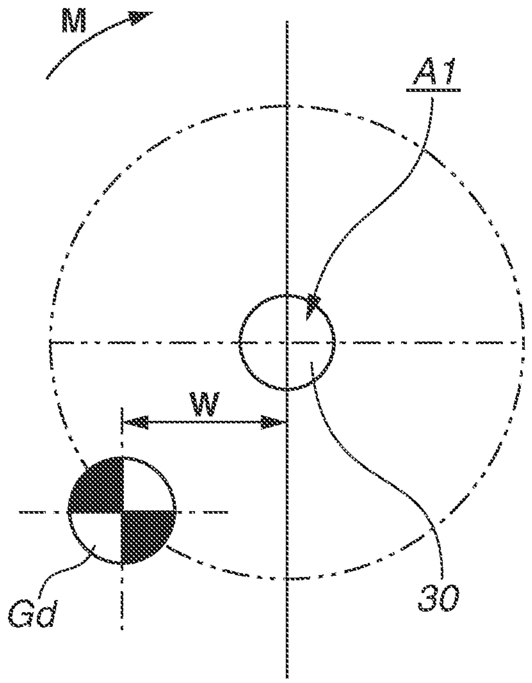
FIG. 7A is a schematic diagram when a center of gravity is below a horizontal line passing through a rotation axis of the developing unit.
Figure 7B:
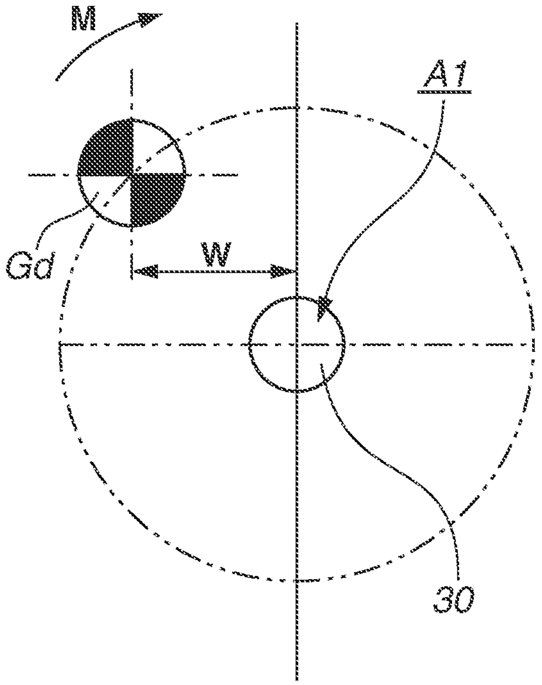
FIG. 7B is a schematic diagram when the center of gravity is above the horizontal line passing through the rotation axis of the developing unit.

FIGS. 7A and 7B are schematic diagrams schematically illustrating the positional relationship between the rotation axis A1 of the developing unit 6 and the center of gravity Gd of the developing unit 6. FIG. 7A is a diagram illustrating a state where the center of gravity of the developing unit 6 is disposed below the horizontal line passing through the rotation axis A1 of the developing unit 6. FIG. 7B is a diagram illustrating a state where the center of gravity of the developing unit 6 is disposed above the horizontal line passing through the rotation axis A1 of the developing unit 6.

FIGS. 7A and 7B are views in the direction of the rotation axis A1 of the developing unit 6. In FIGS. 7A and 7B, a direction M indicates the rotation direction of the developing unit 6, the rotation direction in which the developing roller 11 approaches the photosensitive drum 7.

As illustrated in FIGS. 7A and 7B, in a state where the developing unit 6 is at the separation position, the center of gravity Gd is disposed at a position away from the rotation axis A1 horizontally as much as W. As the developing unit 6 rotates in the direction M, the center of gravity Gd also rotates in the direction M. As illustrated in FIG. 7A, in a state where the center of gravity Gd is below the horizontal line passing through the rotation axis A1, the rotation of the developing unit 6 in the direction M moves the center of gravity Gd in a direction horizontally away from the rotation axis A1. This increases the distance W between the rotation axis A1 and the center of gravity Gd in the horizontal direction, and increases the moment of rotation of the developing unit 6 due to the weight of the developing unit 6 in a separation direction (opposite to the direction M).

On the other hand, in a state where, as illustrated in FIG. 7B, the center of gravity Gd is above the horizontal line passing through the rotation axis A1, the rotation of the developing unit 6 in the M direction moves the center of gravity Gd in a direction horizontally toward the rotation axis A1. This reduces the distance W between the rotation axis A1 and the center of gravity Gd in the horizontal direction, and reduces the moment of rotation of the developing unit 6 due to the weight of the developing unit 6 in the separation direction (opposite to the direction M).

In other words, disposing the center of gravity Gd above the horizontal line passing through the rotation axis A1 can reduce loss due to the weight of the developing unit 6 in a state where the developing roller 11 is in contact with the photosensitive drum 7. The biasing force of the force application unit 101 can thus be reduced. Note that even in a state where the center of gravity Gd is below the horizontal line passing through the rotation axis A1, the increase in the distance W is milder with height of the position of the center of gravity Gd. This can reduce loss due to the weight of the developing unit 6.

Accordingly, the center of gravity Gd is desirably disposed high relative to the rotation axis A1 of the developing unit 6. For that purpose, the rotation axis A1 of the developing unit 6 is desirably disposed at a low position in the process cartridge 1. The center of gravity Gd is desirably disposed at a high position in the process cartridge 1.

<Arrangement of Developing Chamber>

The arrangement of the developing chamber 16*a* according to the present exemplary embodiment will be described with reference to FIGS. 6A and 6B.

As illustrated in FIG. 6B, the developing chamber 16*a* is divided by the vertical line i passing through the center of the pin 30 (rotation axis A1) in a state where the developing unit 6 is at the image forming position. Here, the portion farther from the photosensitive drum 7 than the vertical line i has a capacity greater than that of the portion closer to the photosensitive drum 7 than the vertical line i.

More specifically, the developing chamber 16*a* is divided between a first region S1 and a second region S2 by the vertical line i. The first region S1 is a region on the side opposite to where the photosensitive drum 7 is. The second region S2 is a region located on the same side as where the photosensitive drum 7 is. That is, the second region S2 is closer to the photosensitive drum 7 than the first region S1. The developing chamber 16*a* is disposed so that the first region S1>the second region S2. In other words, the developing chamber 16*a* is disposed so that the first region S1 has a capacity greater than a capacity of the second region S2.

Toner conveyed from the toner accommodation chamber 16*b* by the conveyance member 29 accumulates in the developing chamber 16*a*. More specifically, the toner conveyed from the toner accommodation chamber 16*b* accumulates in a gap m between the supply roller 17 disposed in the developing chamber 16*a* and the bottommost portion 16*d*1 of the partition wall 16*d*.

In the developing unit 6 according to the present exemplary embodiment, the developing chamber 16*a* is disposed so that the first region S1 has a capacity greater than that of the second region S2. The amount of toner accumulated in the first region S1 is thus greater than the amount of toner accumulated in the second region S2. When the force application unit 101 moves in the direction of the arrow V, the weight of the toner accumulated in the first region S1 of the developing chamber 16*a* thus produces a moment in the direction of separating the developing roller 11 from the photosensitive drum 7. This can make the separation of the developing roller 11 by the weight of the developing unit 6 more reliable. In other words, the developing unit 6 can be easily disposed at the separation position by its own weight.

Moreover, since the toner is accumulated in the developing chamber 16*a* disposed above the toner accommodation chamber 16*b*, the toner can be accumulated at a high position in the developing unit 6 even when the toner in the developing unit 6 decreases. This can concentrate the weight of the toner at a high position in the developing unit 6.

Now, the toner accommodation chamber 16*b* is divided by the horizontal line h passing through the rotation axis A1 in a state where the developing unit 6 is at the image forming position. Here, the portion above the horizontal line h has a capacity greater than that of the portion below the horizontal line h.

More specifically, the region above the horizontal line will be referred to as a third region S3, and the region below the horizontal line will be referred to as a fourth region S4. In other words, the fourth region is disposed below the third region. Here, the toner accommodation chamber 16*b* is configured so that the third region S3 has a capacity greater than a capacity of the fourth region S4. The center of gravity Gd of the developing unit 6 can thus be maintained at a high position even when the amount of toner accommodated in the toner accommodation chamber 16*b* decreases. In the present exemplary embodiment, the center of gravity Gd of the developing unit 6 can be disposed above the horizontal line h passing through the rotation axis A1 even when the amount of toner accommodated in the toner accommodation chamber 16*b* decreases.

Suppose that as illustrated in FIG. 1 and FIG. 6B, the developing unit 6 at the image forming position is divided between a first portion and a second portion below the first portion by the horizontal line h passing through the rotation axis A1. The first portion refers to the portion above the horizontal line h, and the second portion refers to the portion below the horizontal line h. Here, the first portion is larger than the second portion. Moreover, the first portion is heavier than the second portion.

<Relationship Between Developing Roller and Rotation Axis of Developing Unit>

The arrangement of the rotation axis A1 of the developing unit 6 and the developing roller 11 will be described with reference to FIGS. 6A and 6B.

As illustrated in FIGS. 6A and 6B, in the present exemplary embodiment, the developing roller 11 and the supply roller 17 are disposed above the pins 30. The developing roller 11 includes a rubber layer 11*a* serving as an elastic layer and a first shaft 11*b* made of metal, disposed inside the rubber layer 11*a*. The supply roller 17 includes a sponge layer 17*a* and a second shaft 17*b* made of metal, disposed inside the sponge layer 17*a*. The sponge layer 17*a* is deformed by a reaction force from the developing roller 11. In the present exemplary embodiment, the rubber layer 11*a* is deformed by a reaction force from the photosensitive drum 7 in a state where the developing unit 6 is at the image forming position. The first shaft 11*b* and the second shaft 17*b* are metal shafts supported by the developing bearings 34 (34F and 34R). The developing roller 11 is heavier than the supply roller 17. The proportion of the developing roller 11 in the weight of the developing unit 6 is thus higher than that of the supply roller 17. The first shaft 11*b* has a maximum diameter greater than that of the second shaft 17*b*. In the present exemplary embodiment, the first shaft 11*b* is the heaviest of the metal components included in the developing unit 6.

In the present exemplary embodiment, the developing roller 11 overlaps the vertical line i in a state where the photosensitive member unit 4 is in the supported posture and the developing unit 6 is at the image forming position. In the present exemplary embodiment, the developing roller 11 also overlaps the vertical line i in a state where the photosensitive member unit 4 is in the supported posture and the developing unit 6 is at the separation position.

As described above, the developing unit 6 is disposed at the separation position by its own weight. By contrast, to dispose the developing unit 6 at the image forming position, the force application unit 101 needs to bias the force receiving portions 34*e*. In other words, if the effect of the own weight of the developing unit 6 is too large, the load of the force application unit 101 increases. On the other hand, if the effect of the own weight of the developing unit 6 is too small, the developing unit 6 is unable to be stably separated.

The developing roller 11 is thus disposed to overlap the vertical line i passing through the rotation axis A1. In particular, in the present exemplary embodiment, the developing roller 11 is disposed so that the vertical line i overlaps the first shaft 11*b* thereof. As illustrated in FIG. 6A, the vertical line i overlaps the first shaft 11*b* in a state where the developing unit 6 is at the separation position. With this configuration, the effect of the weight of the developing roller 11 in a state where the developing unit 6 is at the separation position can be reduced. Moreover, as illustrated in FIG. 6B, the vertical line i overlaps the first shaft 11*b* in a state where the developing unit 6 is at the image forming position. This can reduce the effect of the weight of the developing roller 11 in a state where the developing unit 6 is at the image forming position. In other words, in the configuration where the developing unit 6 is disposed at the separation position at least by its own weight, the force for bringing the developing unit 6 toward the separation position can be prevented from becoming too large. The force application unit 101 of the apparatus main body 100*a* can thus position the developing unit 6 at the image forming position with small force.

In the present exemplary embodiment, the foregoing arrangement of the developing roller 11 heavier than the supply roller 17 can reduce the effect of the component contributing highly to the force in the direction of separating the developing unit 6.

In the present exemplary embodiment, in a state where the developing unit 6 is at the image forming position, the rotation axis A2 of the developing roller 11 is disposed closer to the photosensitive drum 7 than is the vertical line i. In a state where the developing unit 6 is at the separation position, the rotation axis A2 of the developing roller 11 is disposed farther from the photosensitive drum 7 than is the vertical line i. Thus, in a state where the developing unit 6 is at the image forming position, the weight of the developing roller 11 acts in the direction in which the developing roller 11 approaches the photosensitive drum 7. On the other hand, in a state where the developing unit 6 is at the separation position, the weight of the developing roller 11 acts in the direction in which the developing roller 11 moves away from the photosensitive drum 7.

<Assistance for Separation Operation>

Figure 8:
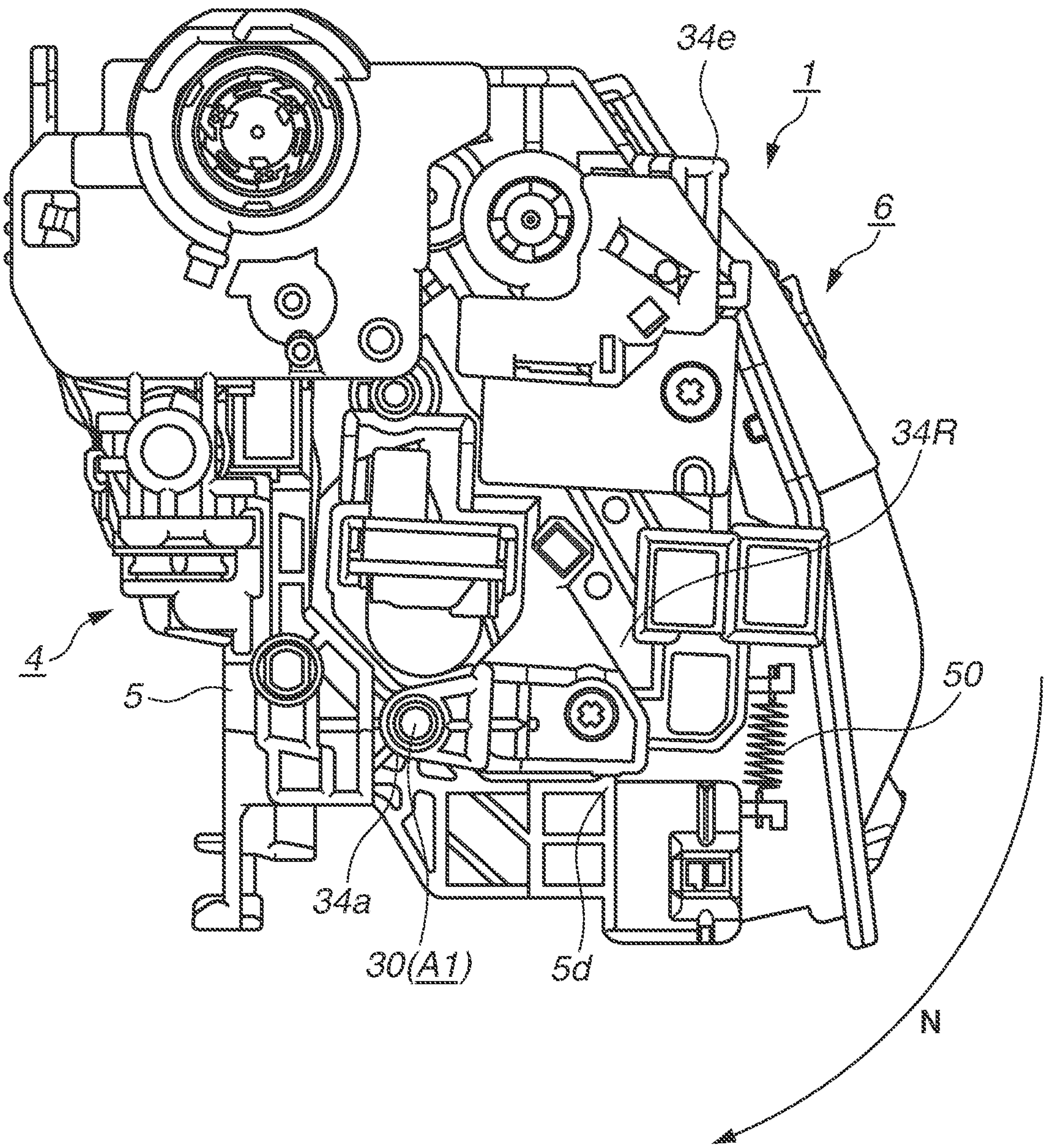
FIG. 8 is a side view of the process cartridge.

Assistance for the separation operation of the developing unit 6 will be described with reference to FIG. 8. FIG. 8 is a side view of the process cartridge 1 according to the present exemplary embodiment. FIG. 8 is a side view of the process cartridge 1 seen in the direction of the rotation axis A1 of the developing unit 6.

As described above, in the present exemplary embodiment, the developing unit 6 moves from the image forming position to the separation position at least by its own weight so that the developing roller 11 is separated from the photosensitive drum 7. However, the movement of the developing unit 6 from the image forming position to the separation position does not need to be effected only by the own weight. Specifically, the process cartridge 1 may include the biasing member 50 for biasing the developing unit 6 from the image forming position to the separation position. In other words, the biasing member 50 assists the developing unit 6 in moving by the weight of the developing unit 6. In the present exemplary embodiment, the developing unit 6 in the separation position is in contact with a restriction portion 5*d* that is a part of the first support frame 5. The developing unit 6 is thereby restricted from moving in the direction in which the developing roller 11 moves away from the photosensitive drum 7.

The biasing member 50 is intended to assist the movement of the developing unit 6 and thus does not need to produce such a strong force as to deform part of the developing unit 6 or the photosensitive member unit 4. In the present exemplary embodiment, in a state where the photosensitive member unit 4 is in a posture vertically opposite to the supported posture (in a posture vertically opposite from FIG. 1), the developing unit 6 is disposed at the image forming position by its own weight against the biasing force of the biasing member 50. In other words, the developing roller 11 is allowed to be in contact with the photosensitive drum 7.

Note that the process cartridge 1 does not need to include the biasing member 50. That is, the process cartridge 1 may be configured so that the developing unit 6 is disposed at the separation position only by its own weight in a state where the photosensitive member unit 4 is in the supported posture.

As described above, the image forming apparatus 100 according to the present exemplary embodiment performs the image forming operation using a contact developing method. However, the present exemplary embodiment is not limited to the contact developing method. The present invention can also be applied to an image forming apparatus that performs an image forming operation in a state where a gap is formed between the photosensitive drum 7 and the developing roller 11 when the developing unit 6 is at the image forming position. In such a configuration, the developing roller 11 is disposed near the photosensitive drum 7 in a state where the developing unit 6 is at the image forming position.

The present invention is not limited to the foregoing exemplary embodiment, and various changes and modifications may be made without departing from the spirit and scope of the present invention. The following claims are therefore attached to make the scope of the present invention public.

As described above, according to the present invention, the force receiving portion that receives the force for bringing the developer bearing member into contact with the photosensitive member, the rotation axis of the second unit, and the developer bearing member can be suitably disposed.

Moreover, according to the present invention, the developer bearing member can be stably separated from the photosensitive member.

Furthermore, according to the present invention, the force for bringing the developer bearing member into contact with the photosensitive member can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A cartridge comprising:

a photosensitive unit including a photosensitive drum rotatable about a drum axis and a first frame supporting the photosensitive drum, wherein the first frame is provided with a first hole;

a developing unit including a developing roller rotatable about a developing axis and a second frame supporting the developing roller, wherein the second frame is provided with a second hole; and a first pin inserted into the first hole and the second hole such that the developing unit is coupled with the photosensitive unit and is rotatable about a rotation axis to move with respect to the photosensitive unit between a contact position where the developing roller is in contact with the photosensitive drum and a separate position where the developing roller is separated from the photosensitive drum, wherein, in a state where the photosensitive unit is in a predetermined posture, (i) the developing roller is disposed above a horizontal line passing through the rotation axis and (ii) a vertical line passing through the rotation axis is disposed between a position of the developing axis when the developing unit is in the contact position and a position of the developing axis when the developing unit is in the separate position when viewed in a direction of the rotation axis, and wherein, in the state where the photosensitive unit is in the predetermined posture, the developing unit is movable from the contact position to the separate position by its own weight.

2. The cartridge according to claim 1, wherein, in a state where the photosensitive unit is in the predetermined posture and the developing unit is in the contact position, the developing roller overlaps the vertical line passing through the rotation axis when viewed in the direction of the rotation axis, and wherein, in a state where the photosensitive unit is in the predetermined posture and the developing unit is in the separate position, the developing roller overlaps the vertical line passing through the rotation axis when viewed in the direction of the rotation axis.

3. The cartridge according to claim 1, wherein first frame is provided with a third hole and the second frame is provided with a fourth hole, the cartridge further comprising:

a second pin inserted into the third hole and the fourth hole such that the developing unit is coupled with the photosensitive unit and is rotatable about the rotation axis to move with respect to the photosensitive unit between the contact position and the separate position.

4. The cartridge according to claim 1, wherein the developing roller includes a rubber layer and a first shaft made of metal, and wherein, in a state where the photosensitive unit is in the predetermined posture and the developing unit is in the separate position, the vertical line overlaps the first shaft when viewed in the direction of the rotation axis.

5. The cartridge according to claim 1, wherein the developing unit includes a supply roller configured to be in contact with the developing roller and supply a developer, and wherein the developing roller is heavier than the supply roller.

6. The cartridge according to claim 5, wherein, in the state where the photosensitive unit is in the predetermined posture, the supply roller is disposed farther from the photosensitive drum than the vertical line.

7. The cartridge according to claim 1, wherein in the state where the photosensitive unit is in the predetermined posture, the developing axis is disposed below the drum axis.

8. The cartridge according to claim 1, wherein the second frame includes a force receiving portion configured to receive an external force such that the developing unit is in the contact position in the state where the photosensitive unit is in the predetermined posture.

9. The cartridge according to claim 8, wherein, in the state where the photosensitive unit is in the predetermined posture, the force receiving portion is disposed above the horizontal line.

10. The cartridge according to claim 8, wherein, a distance between the force receiving portion and the developing axis is shorter than a distance between the force receiving portion and the rotation axis and a distance between the developing axis and the rotation axis.

11. The cartridge according to claim 1, wherein, in the state where the photosensitive unit is in the predetermined posture, a center of gravity of the developing unit is disposed above the horizontal line and farther from the photosensitive drum than the vertical line.

12. The cartridge according to claim 11, wherein, in the state where the photosensitive unit is in the predetermined posture, the center of gravity is disposed below the developing roller.

13. The cartridge according to claim 1, wherein, if the developing unit is divided between a first portion and a second portion below the first portion by the horizontal line in a state where the photosensitive unit is in the predetermined posture and the developing unit is in the contact position, the first portion is heavier than the second portion.

14. The cartridge according to claim 1, wherein a developing frame includes a partition wall configured to divide an interior of the developing frame between a developer accommodation chamber configured to accommodate a developer and a developing chamber where the developing roller is disposed, and wherein the partition wall has an opening through which the developer accommodation chamber and the developing chamber communicate with each other.

15. The cartridge according to claim 14, wherein, in the state where the photosensitive unit is in the predetermined posture, at least a part of the developing chamber is disposed directly above at least a part of the developer accommodation chamber.

16. The cartridge according to claim 14, wherein the developer accommodation chamber includes a conveyance member configured to convey a developer from the developer accommodation chamber to the developing chamber.

17. An image forming apparatus comprising:

the cartridge according to claim 1;

an apparatus main body; and an exposure device configured to form an electrostatic latent image on the photosensitive drum.

* * * * *